US012286098B2

United States Patent
Nakashima

(10) Patent No.: US 12,286,098 B2
(45) Date of Patent: Apr. 29, 2025

(54) CONTROL DEVICE, CONTROL METHOD, AND STORAGE MEDIUM STORING CONTROL PROGRAM

(71) Applicant: HONDA MOTOR CO., LTD., Tokyo (JP)

(72) Inventor: Hiroyuki Nakashima, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 41 days.

(21) Appl. No.: 18/227,104

(22) Filed: Jul. 27, 2023

(65) Prior Publication Data
US 2024/0042989 A1 Feb. 8, 2024

(30) Foreign Application Priority Data
Aug. 3, 2022 (JP) ................................ 2022-123703

(51) Int. Cl.
| B60W 30/06 | (2006.01) |
| B60W 30/09 | (2012.01) |
| B60W 50/14 | (2020.01) |
| G06V 20/58 | (2022.01) |

(52) U.S. Cl.
CPC ............ B60W 30/06 (2013.01); B60W 30/09 (2013.01); B60W 50/14 (2013.01); G06V 20/586 (2022.01); *B60W 2420/403* (2013.01); *B60W 2540/215* (2020.02)

(58) Field of Classification Search
CPC ...... B60W 30/06; B60W 30/09; B60W 50/14; G06V 20/586
See application file for complete search history.

(56) References Cited

U.S. PATENT DOCUMENTS

| 10,937,256 B2 * | 3/2021 | Nakamura ............ G06V 20/56 |
| 11,458,961 B2 * | 10/2022 | Hiei ...................... B60W 30/06 |
| 11,651,596 B2 * | 5/2023 | Hiei ...................... B60W 30/06 |
| | | 701/117 |

(Continued)

FOREIGN PATENT DOCUMENTS

| JP | 2010-282344 A | 12/2010 |
| JP | 2019-026091 A | 2/2019 |

(Continued)

OTHER PUBLICATIONS

Nov. 14, 2023, translation of Japanese Office Action issued for related JP Application No. 2022-123703.

*Primary Examiner* — John A Tweel, Jr.
(74) *Attorney, Agent, or Firm* — Paratus Law Group, PLLC

(57) ABSTRACT

A control device includes an imaging unit configured to acquire imaging data of surroundings of a moving body, a reception unit configured to receive selection of a predetermined parking position from a user of the moving body, and a control unit configured to execute automatic parking control for parking the moving body at the predetermined parking position based on the imaging data and the predetermined parking position, and to register the predetermined parking position as a designated parking position. When the moving body is stopped after the automatic parking control is started and before the predetermined parking position is reached, the control unit registers a stop position where the moving body is stopped as the designated parking position.

8 Claims, 18 Drawing Sheets

(56) References Cited

U.S. PATENT DOCUMENTS

| | | | |
|---|---|---|---|
| 11,718,343 B2* | 8/2023 | Hiei | ................... G06T 7/12 340/932.2 |
| 2019/0031239 A1 | 1/2019 | Nakamura | |
| 2020/0242936 A1 | 7/2020 | Matsunaga et al. | |
| 2021/0107461 A1* | 4/2021 | Matsunaga | ............. B60R 11/04 |

FOREIGN PATENT DOCUMENTS

| | | |
|---|---|---|
| JP | 2019-188934 A | 10/2019 |
| JP | 2020-117128 A | 8/2020 |

* cited by examiner

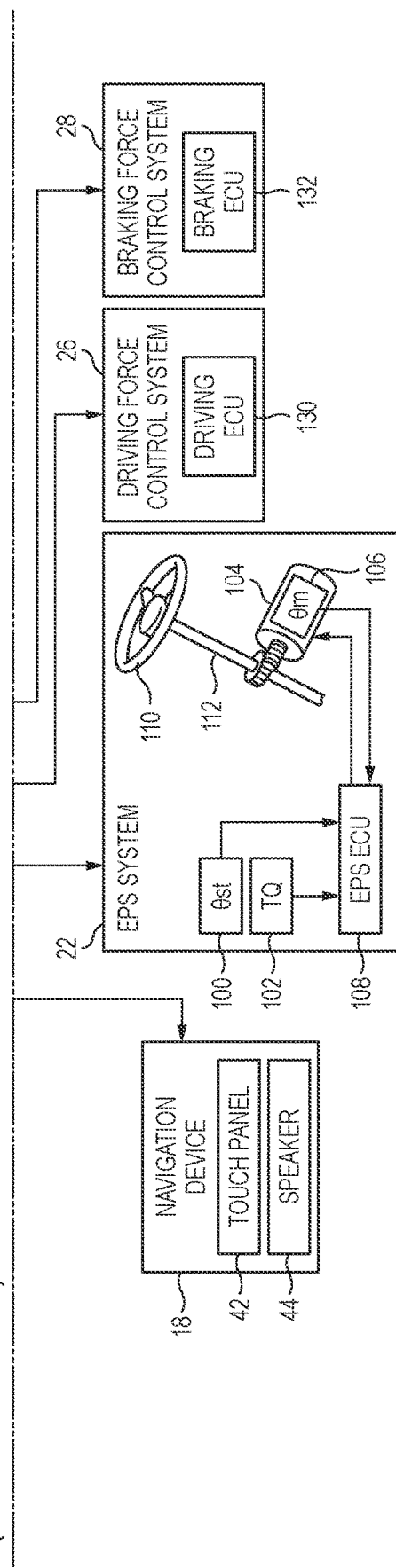

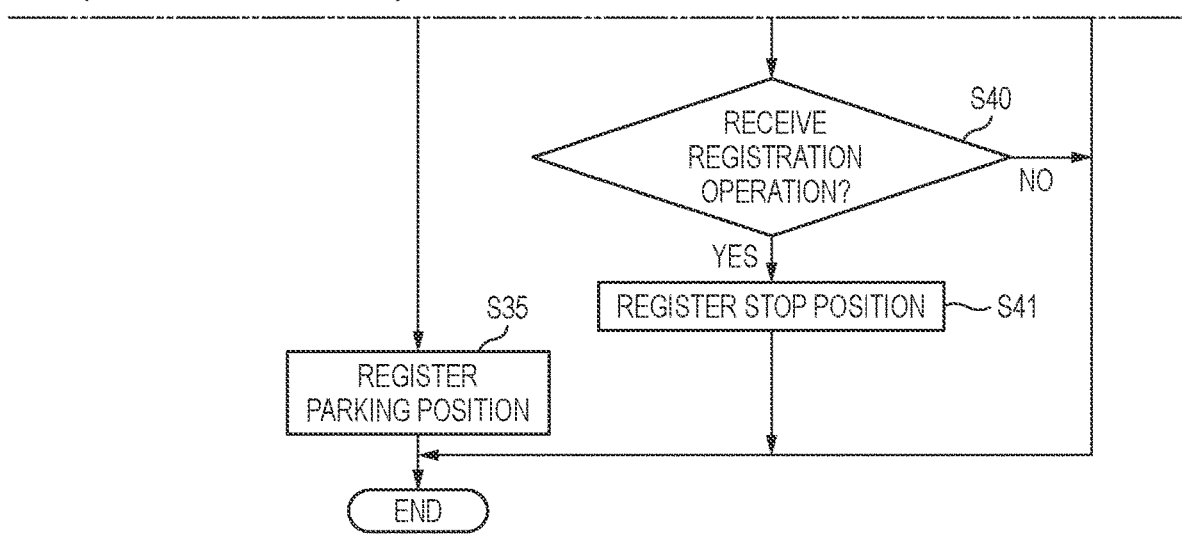

CONTROL DEVICE, CONTROL METHOD, AND STORAGE MEDIUM STORING CONTROL PROGRAM

CROSS REFERENCE TO RELATED APPLICATIONS

This application claims priority to Japanese Patent Application No. 2022-123703 filed on Aug. 3, 2022, the content of which is incorporated herein by reference.

TECHNICAL FIELD

The present invention relates to a control device, a control method, and a storage medium storing a control program.

BACKGROUND ART

In recent years, efforts have been made to provide access to a sustainable transportation system in consideration of people vulnerable among traffic participants. In order to implement the above, focus has been placed on research and development on further improving safety and convenience of traffic by research and development related to automatic driving technique.

In the related art, automatic parking has been known in which a vehicle is automatically moved and parked in a target parking frame selected by a user. For example, JP2020-117128A discloses a parking assistance device that can perform automatic parking control of a vehicle based on an instruction from a user, store a position of the parked vehicle in a storage device as a registered parking position, and finely adjusts the registered parking position for the vehicle when necessary.

Incidentally, in the automatic driving technique, a position where the vehicle is parked is usually a flat place, but the vehicle may be sometimes parked in an inclined place. However, JP2020-117128A discloses that the vehicle is parked at a planned parking position of home, but does not disclose that the parking position is an inclined parking position. Therefore, there is room for improvement in the related art in parking the vehicle at the inclined parking position.

An object of the present disclosure is to provide a control device, a control method, and a storage medium storing a control program that can appropriately register a parking position even if the position where a moving body is parked is inclined, which contributes to development of the sustainable transportation system accordingly.

SUMMARY OF INVENTION

According to an aspect of the present disclosure, there is provided a control device including an imaging unit configured to acquire imaging data of surroundings of a moving body, a reception unit configured to receive selection of a predetermined parking position from a user of the moving body, and a control unit configured to execute automatic parking control for parking the moving body at the predetermined parking position based on the imaging data and the predetermined parking position, and to register the predetermined parking position as a designated parking position. When the moving body is stopped after the automatic parking control is started and before the predetermined parking position is reached, the control unit registers a stop position where the moving body is stopped as the designated parking position.

According to another aspect of the present disclosure, there is provided a control method performed by a control device, the control device including an imaging unit configured to acquire imaging data of surroundings of a moving body, a reception unit configured to receive selection of a predetermined parking position from a user of the moving body, and a control unit configured to execute automatic parking control for parking the moving body at the predetermined parking position based on the imaging data and the predetermined parking position and to register the predetermined parking position as a designated parking position. The control method includes registering, by the control unit, a stop position where the moving body is stopped as the designated parking position when the moving body is stopped after the automatic parking control is started and before the predetermined parking position is reached.

According to another aspect of the present disclosure, there is provided a non-transitory computer-readable storage medium storing a control program for causing a control unit of a control device, which includes an imaging unit configured to acquire imaging data of surroundings of a moving body, a reception unit configured to receive selection of a predetermined parking position from a user of the moving body, and the control unit configured to execute automatic parking control for parking the moving body at the predetermined parking position based on the imaging data and the predetermined parking position, and to register the predetermined parking position as a designated parking position, to execute processing of registering a stop position where the moving body is stopped as the designated parking position when the moving body is stopped after the automatic parking control is started and before the predetermined parking position is reached.

DESCRIPTION OF EMBODIMENTS

Figure 1:
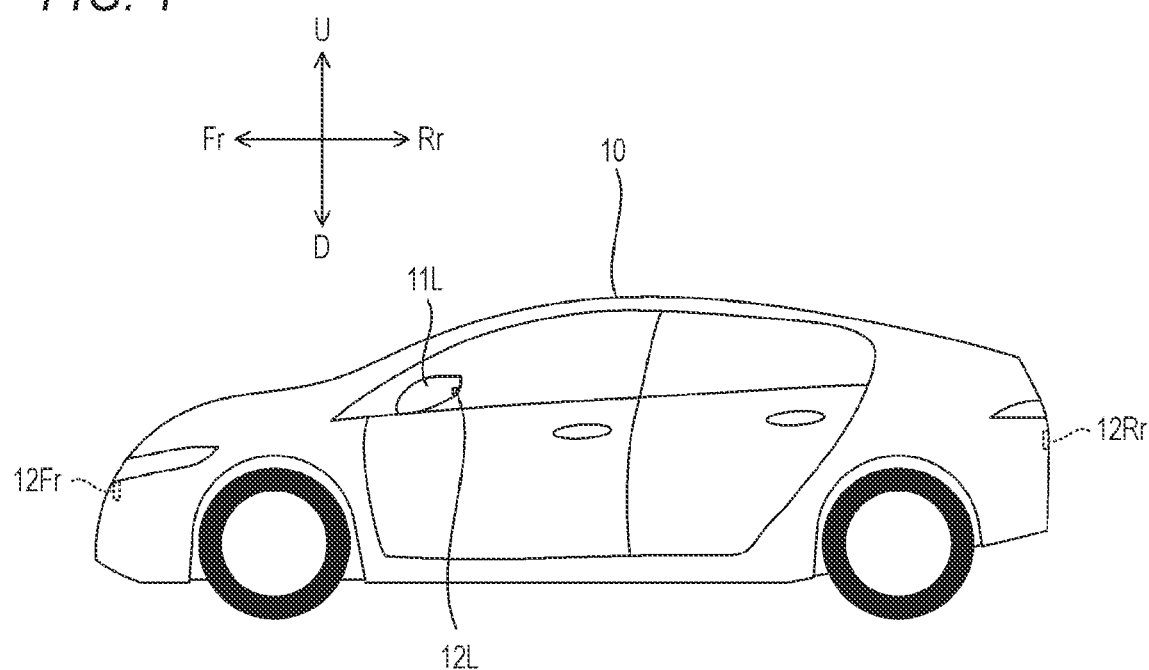
FIG. 1 is a side view showing an example of a vehicle on which a control device according to the present embodiment is mounted.

Hereinafter, an embodiment of a control device, a control method, and a control program of the present invention will be described with reference to the attached drawings. The drawings are viewed in directions of reference numerals. Further, in the present specification and the like, in order to simplify and clarify description, a front-rear direction, a left-right direction, and an upper-lower direction are described according to directions viewed from a user (for example, a driver) of a vehicle TO shown in FIGS. 1 and 2. In the drawings, a front side of the vehicle 10 is shown as Fr, a rear side is shown as Rr, a left side is shown as a right side is shown as R, an upper side is shown as U, and a lower side is shown as D.

Vehicle 10 on Which Control Device of Present Invention Is Mounted

Figure 2:
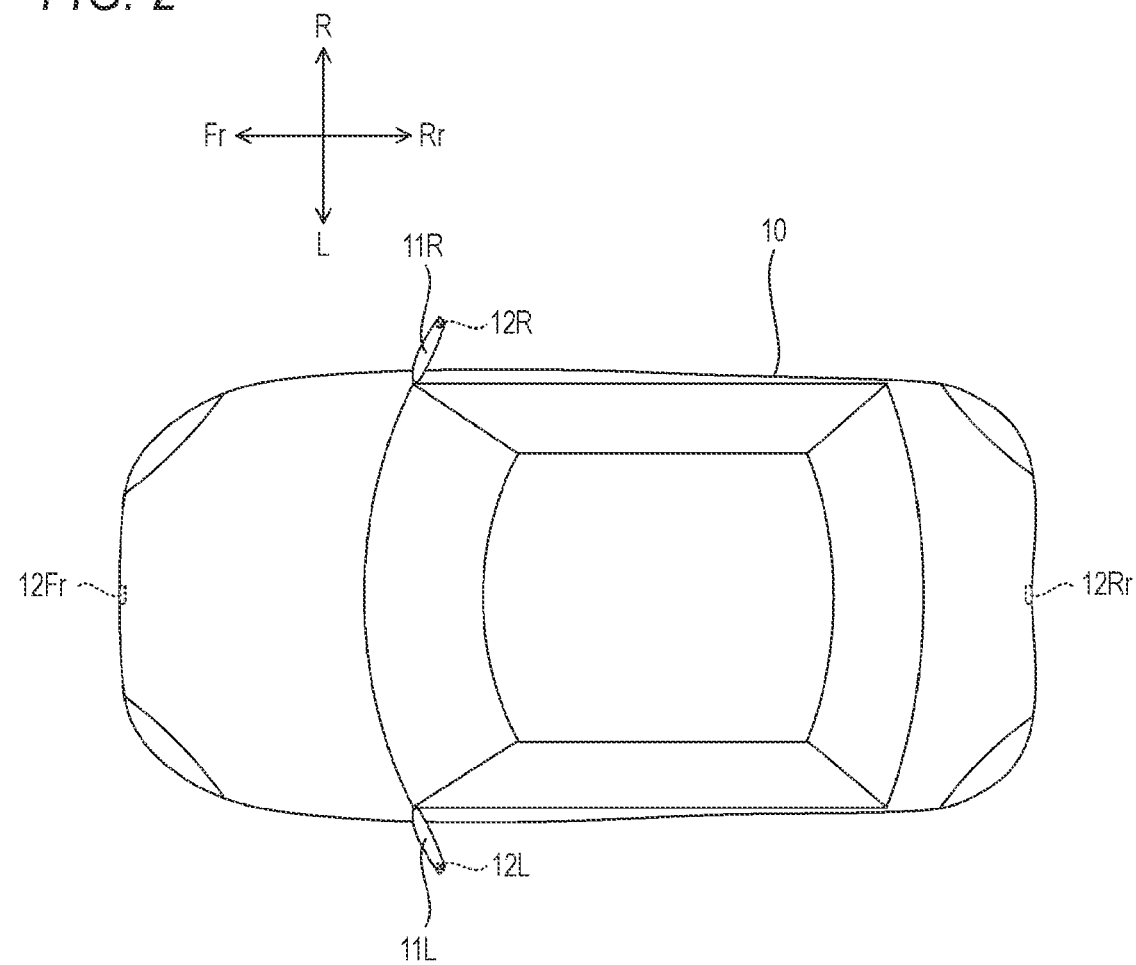
FIG. 2 is a top view of the vehicle shown in FIG. 1.

FIG. 1 is a side view of the vehicle 10 on which the control device of the present invention is mounted. FIG. 2 is a top view of the vehicle 10 shown in FIG. 1. The vehicle 10 is an example of a moving body of the present invention.

The vehicle 10 is an automobile including a drive source (not shown), and wheels including driven wheels driven by power of the drive source and steerable steering wheels. In the present embodiment, the vehicle 10 is a four-wheel automobile including a pair of left and right front wheels and rear wheels. The drive source of the vehicle 10 is, for example, an electric motor. The drive source of the vehicle 10 may be an internal combustion engine such as a gasoline engine or a diesel engine, or a combination of the electric motor and the internal combustion engine. Further, the drive source of the vehicle 10 may drive the pair of left and right front wheels, the pair of left and right rear wheels, or the four wheels including the pair of left and right front wheels and rear wheels. Both the front wheels and the rear wheels may be the steerable steering wheels, or either one of the front wheels and the rear wheels may be the steerable steering wheels.

The vehicle 10 further includes side mirrors 11L and 11R. The side mirrors 11L and 11R are mirrors (rear-view mirrors) that are provided on outer sides of front seat doors of the vehicle 10 and that are for the user to confirm a rear side and rear left and right sides. Each of the side mirrors 11L and 11R is fixed to a main body of the vehicle 10 by a rotation shaft that extends in a perpendicular direction, and can be opened and closed by being rotated around the rotation shaft.

The vehicle 10 further includes a front camera 12Fr, a rear camera 12Rr, a left side camera 12L, and a right side camera 12R. The front camera 12Fr is a digital camera that is provided on a front side of the vehicle 10 and that images the front side of the vehicle 10. The rear camera 12Rr is a digital camera that is provided on a rear side of the vehicle 10 and that images the rear side of the vehicle 10. The left side camera 12L is a digital camera that is provided on the left side mirror 11L of the vehicle 10 and that images a left side of the vehicle 10. The right side camera 12R is a digital camera that is provided on the right side mirror 11R of the vehicle 10 and that images a right side of the vehicle 10. The front camera 12Fr, the rear camera 12Rr, the left side camera 12L, and the right side camera 12R are examples of an imaging unit of the present invention.

Internal Configuration of Vehicle 10

Figure 3:
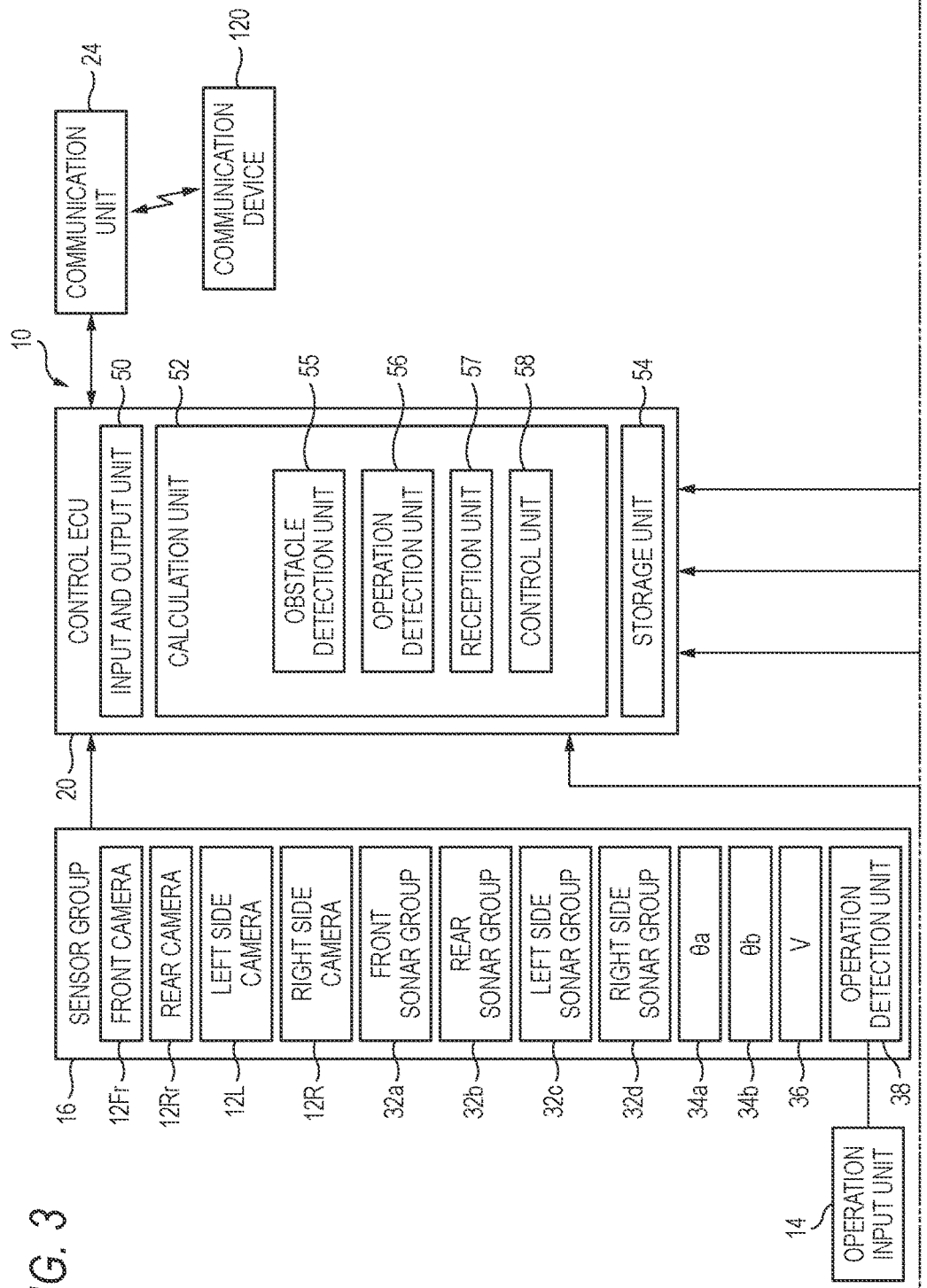
FIG. 3 is a block diagram showing an internal configuration of the vehicle shown in FIG. 1.

FIG. 3 is a block diagram showing an example of an internal configuration of the vehicle 10 shown in FIG. 1. As shown in FIG. 3, the vehicle 10 includes a sensor group 16, a navigation device 18, a control electronic control unit (ECU) 20, an electric power steering (EPS) system 22, and a communication unit 24. The vehicle 10 further includes a driving force control system 26 and a braking force control system 28. The sensor group 16 and the control ECU 20 constitute an example of the control device of the present invention.

The sensor group 16 acquires various detection values used for control performed by the control ECU 20. The sensor group 16 includes the front camera 12Fr, the rear camera 12Rr, the left side camera 12L, and the right side camera 12R. Further, the sensor group 16 includes a front sonar group 32a, a rear sonar group 32b, a left side sonar group 32c, and a right side sonar group 32d. Further, the sensor group 16 includes wheel sensors 34a and 34b, a vehicle speed sensor 36, and an operation detection unit 38. In addition, the sensor group 16 may include, for example, a radar.

The front camera 12Fr, the rear camera 12Rr, the left side camera 12L, and the right side camera 12R acquire imaging data (for example, the surrounding image) for recognizing the external environment of the vehicle 10 by imaging surroundings of the vehicle 10. Surrounding images captured by the front camera 12Fr, the rear camera 12Rr, the left side camera 12L, and the right side camera 12R are referred to as a front image, a rear image, a left side image, and a right side image, respectively. An image constituted by the left side image and the right side image may be referred to as a side image. A surrounding image generated by combining imaging data of the front camera 12Fr, the rear camera 12Rr, the left side camera 12L, and the right side camera 12R may be referred to as a top view image of the vehicle 10.

The front sonar group 32a, the rear sonar group 32b, the left side sonar group 32c, and the right side sonar group 32d emit sound waves to the surroundings of the vehicle 10, and receive reflected sounds from other objects. The front sonar group 32*a* includes, for example, four sonars. The sonars that constitute the front sonar group 32*a* are respectively provided on an obliquely left front side, a front left side, a front right side, and an obliquely right front side of the vehicle 10. The rear sonar group 32*b* includes, for example, four sonars. The sonars that constitute the rear sonar group 32*b* are respectively provided on an obliquely left rear side, a rear left side, a rear right side, and an obliquely right rear side of the vehicle 10. The left side sonar group 32*c* includes, for example, two sonars. The sonars that constitute the left side sonar group 32*c* are respectively provided at a left side front portion and a left side rear portion of the vehicle 10. The right side sonar group 32*d* includes, for example, two sonars. The sonars that constitute the right side sonar group 32*d* are respectively provided at a right side front portion and a right side rear portion of the vehicle 10.

The wheel sensors 34*a* and 34*b* detect rotation angles of the wheels of the vehicle 10. The wheel sensors 34*a* and 34*b* may be implemented by angle sensors, or may be implemented by displacement sensors. The wheel sensors 34*a* and 34*b* output detection pulses each time the wheels are rotated at a predetermined angle. The detection pulses output from the wheel sensors 34*a* and 34*b* are used for calculating the rotation angles of the wheels and rotation speeds of the wheels. A movement distance of the vehicle 10 is calculated based on the rotation angles of the wheels. The wheel sensor 34*a* detects, for example, a rotation angle of the left rear wheel. The wheel sensor 34*b* detects, for example, a rotation angle θb of the right rear wheel.

The vehicle speed sensor 36 detects a speed of a vehicle body of the vehicle 10, that is, a vehicle speed V, and outputs the detected vehicle speed V to the control ECU 20. The vehicle speed sensor 36 detects the vehicle speed V based on, for example, rotation of a countershaft of a transmission.

The operation detection unit 38 detects operation content of a user performed using the operation input unit 14, and outputs the detected operation content to the control ECU 20. The operation input unit 14 includes various user interfaces such as a side mirror switch for switching between open and closed states of the side mirrors 11L and 11R, and a shift lever (selector lever or selector).

The navigation device 18 detects a current position of the vehicle 10 by using, for example, a global positioning system (GPS), and guides the user to a path to a destination. The navigation device 18 includes a storage device (not shown) provided with a map information database.

The navigation device 18 includes a touch panel 42 and a speaker 44. The touch panel 42 functions as an input device and a display device of the control ECU 20. The speaker 44 outputs various kinds of guidance information to a passenger of the vehicle 10 by a sound.

The touch panel 42 is configured to input various commands to the control ECU 20. For example, the user can input a command related to movement assistance of the vehicle 10 via the touch panel 42. The movement assistance includes parking assistance and parking-lot-leaving assistance of the vehicle 10. Further, the touch panel 42 is configured to display various screens related to control content of the control ECU 20. For example, a screen related to the movement assistance of the vehicle 10 is displayed on the touch panel 42. Specifically, a parking assistance button for requesting the parking assistance and a parking-lot-leaving assistance button for requesting the parking-lot-leaving assistance of the vehicle 10 are displayed on the touch panel 42. The parking assistance button includes an automatic parking button for requesting parking by automatic steering of the control ECU 20, and an assisted parking button for requesting assistance during parking by an operation of the user. The parking-lot-leaving assistance button includes an automatic parking-lot-leaving button for requesting parking-lot-leaving by the automatic steering of the control ECU 20, and an assisted parking-lot-leaving button for requesting assistance during parking-lot-leaving by an operation of the user. A constituent element other than the touch panel 42, for example, a smartphone or a tablet terminal may be used as an input device or a display device.

The "parking" is, for example, a stop as an occupant gets on or off the vehicle, and excludes a temporary stop due to a traffic signal or the like. Further, a "parking position" is a position where the moving body is stopped.

The control ECU 20 includes an input and output unit 50, a calculation unit 52, and a storage unit 54. The calculation unit 52 is implemented by, for example, a central processing unit (CPU). The calculation unit 52 performs various kinds of control by controlling the units based on a program stored in the storage unit 54. Further, the calculation unit 52 inputs and outputs a signal from and to each unit connected to the control ECU 20 via the input and output unit 50.

The calculation unit 52 includes an obstacle detection unit 55 that detects an obstacle around the vehicle 10, an operation detection unit 56 that detects a stop operation from the user, a reception unit 57 that receives a parking instruction from the user, and a control unit 58 that controls automatic movement of the vehicle 10.

The obstacle detection unit 55 acquires an obstacle detection signal output when the sensor group 16 (for example, the sonars or the radars) detects an obstacle from the sensors, and detects the obstacle around the vehicle 10 based on the acquired obstacle detection signal.

The operation detection unit 56 acquires a stop operation detection signal output when the user performs a stop operation for stopping the vehicle 10, and detects the stop operation from the user based on the acquired stop operation detection signal. The stop operation detection signal is output, for example, when a brake of the vehicle 10 is stepped on, when a position of the shift lever of the vehicle 10 is shifted to a parking range, or when a side brake of the vehicle 10 is pulled.

The reception unit 57 receives an instruction signal for instructing an operation of the vehicle 10 input from the user via the touch panel 42 of the navigation device 18 or the smartphone. For example, when a predetermined parking candidate position is designated by selection of the user from parking candidate positions displayed on the touch panel 42, the reception unit 57 receives a signal output from the touch panel 42 by the designation as an instruction signal for parking the vehicle 10.

The control unit 58 performs the automatic parking assistance and the automatic parking-lot-leaving assistance of the vehicle 10 by the automatic steering for automatically operating the steering 110 under control of the control unit 58. In assisting the automatic steering, an accelerator pedal (not shown), a brake pedal (not shown), and the operation input unit 14 are automatically operated. Further, the control unit 58 performs assisted parking assistance and assisted parking-lot-leaving assistance when the vehicle 10 is manually parked and manually caused to leave a parking lot by operating the accelerator pedal, the brake pedal, and the operation input unit 14 by the user.

For example, the control unit 58 performs automatic parking control of parking the vehicle 10 at a designated predetermined parking position and automatic parking-lot-leaving control of causing the vehicle 10 to leave the predetermined parking position based on the imaging data of the surroundings of the vehicle 10 acquired by the front camera 12Fr, the rear camera 12Rr, the left side camera 12L, and the right side camera 12R and the predetermined parking position designated by the user.

The control unit 58 registers the predetermined parking position designated by the user in the storage unit 54 as the designated parking position. The control unit 58 registers features related to the designated parking position in the storage unit 54 as registered features based on the imaging data of the surroundings of the vehicle 10 acquired by the front camera 12Fr, the rear camera 12Rr, the left side camera 12L, and the right side camera 12R. The control unit 58 performs the automatic parking control of parking the vehicle 10 at the designated parking position based on the imaging data of the surroundings of the vehicle 10 and the registered features related to the designated parking position designated by the user.

The features related to the designated parking position include features of the designated parking position itself, features around the designated parking position, and the like. Examples of the features of the designated parking position itself include features in which characters such as "parking" are displayed in the designated parking position. Examples of the features around the designated parking position include featured buildings, obstacles, and the like present around the designated parking position.

When an obstacle is detected by the obstacle detection unit 55 after the automatic parking control of the vehicle 10 is started based on an instruction from the user and before the predetermined parking position selected by the user is reached, the control unit 58 executes stop control of stopping the vehicle 10. Further, when the obstacle is detected by the obstacle detection unit 55 after the automatic parking control of the vehicle 10 is started based on the instruction from the user and before the predetermined parking position selected by the user is reached, the control unit 58 issues a notification prompting the user to stop the automatic parking of the vehicle 10.

When the vehicle 10 is stopped after the automatic parking control is started and before the predetermined parking position is reached, the control unit 58 registers a stop position of the vehicle 10 in the storage unit 54 as the designated parking position for the vehicle 10. For example, when the vehicle 10 is stopped in response to a fact that an obstacle is detected by the obstacle detection unit 55 after the automatic parking control is started and before the predetermined parking position is reached, the control unit 58 registers the stop position where the vehicle 10 is stopped in the storage unit 54 as the designated parking position for the vehicle 10. Further, when the vehicle 10 is stopped in response to a fact that the stop operation is detected by the operation detection unit 56 after the automatic parking control is started and before the predetermined parking position is reached, the control unit 58 registers the stop position where the vehicle 10 is stopped in the storage unit 54 as the designated parking position for the vehicle 10. When the vehicle 10 is stopped other the automatic parking control is started and before the predetermined parking position is reached, the control unit 58 may make an inquiry to the user as to whether to register the stop position where the vehicle 10 is stopped in the storage unit 54 as the designated parking position for the vehicle 10.

When the vehicle 10 is stopped after the automatic parking control is started and before the predetermined parking position is reached, the control unit 58 detects a distance from the stop position where the vehicle 10 is stopped to the predetermined parking position, and compares the detected distance from the predetermined parking position with a preset distance threshold. The control unit 58 registers the stop position where the vehicle 10 is stopped in the storage unit 54 as the designated parking position for the vehicle 10 based on a comparison result between the distance from the parking position and the distance threshold. For example, when the distance from the parking position is equal to or smaller than the distance threshold, the control unit 58 registers the stop position where the vehicle 10 is stopped as the designated parking position for the vehicle 10. Further, when the distance from the parking position is larger than the distance threshold, the control unit 58 does not register the stop position where the vehicle 10 is stopped as the designated parking position for the vehicle 10. The distance threshold will be described later with reference to FIGS. 9 and 10.

The EPS system 22 includes a steering angle sensor 100, a torque sensor 102, an EPS motor 104, a resolver 106, and an EPS ECU 108. The steering angle sensor 100 detects a steering angle θst of the steering 110. The torque sensor 102 detects a torque TQ applied to the steering 110.

The EPS motor 104 applies a driving force or a reaction force to a steering column 112 coupled to the steering 110, thereby enabling the occupant to perform operation assistance of the steering 110 and automatic steering during the parking assistance. The resolver 106 detects a rotation angle θm of the EPS motor 104. The EPS ECU 108 controls the entire EPS system 22. The EPS ECU 108 includes an input and output unit (not shown), a calculation unit (not shown), and a storage unit (not shown).

The communication unit 24 can perform wireless communication with another communication device 120. The other communication device 120 is a base station, a communication device of another vehicle, an information terminal such as a smartphone carried by the passenger of the vehicle 10, or the like.

The driving force control system 26 includes a driving ECU 130. The driving force control system 26 executes driving force control of the vehicle 10. The driving ECU 130 controls a driving force of the vehicle 10 by controlling an engine or the like (not shown) based on an operation performed by the user on the accelerator pedal (not shown).

The braking force control system 28 includes a braking ECU 132. The braking force control system 28 executes braking force control of the vehicle 10. The braking ECU 132 controls a braking force of the vehicle 10 by controlling a braking mechanism or the like (not shown) based on an operation performed by the user on the brake pedal (not shown).

Automatic Parking Control Performed by Calculation Unit 52

Next, the automatic parking control of the vehicle 10 performed by the calculation unit 52 will be described.

Figure 4:
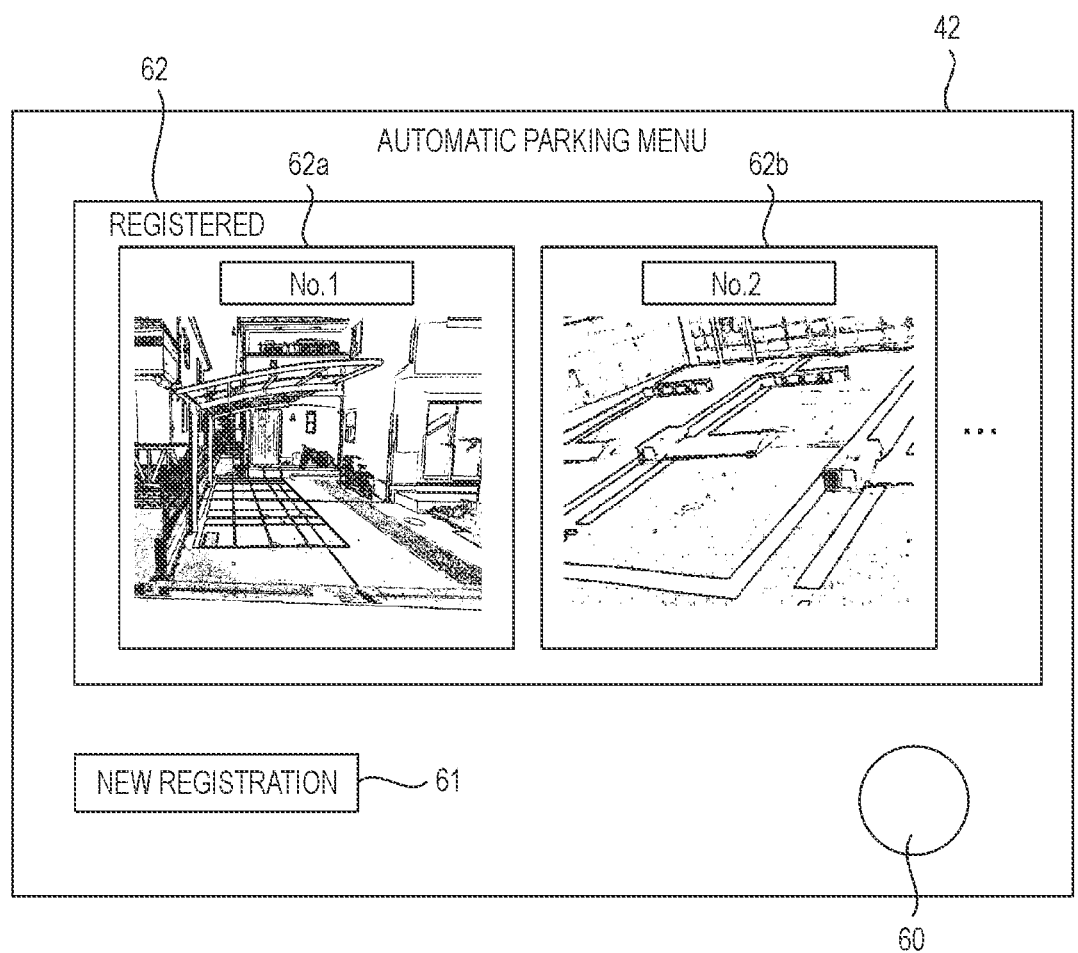
FIG. 4 is a diagram showing an example of an image displayed on a navigation device when automatically parking the vehicle.

FIG. 4 is a diagram showing an example of an "automatic parking menu" displayed on the touch panel 42 of the navigation device 18 when automatically parking the vehicle 10. An image of the automatic parking menu is displayed by touching an automatic parking button 60 displayed on the touch panel 42. The automatic parking button 60 is touched to display the automatic parking menu when, for example, the driver Who wants to park the vehicle 10 comes to a vicinity of a parking lot.

As shown in FIG. 4, a new registration button 61 and a registered parking position image button 62 are displayed in the image of the automatic parking menu. The new registration button 61 is a button operated when the vehicle 10 is to be parked at a parking position newly registered as the designated parking position. The registered parking position image button 62 is a button operated when the vehicle 10 is to be parked at the already registered designated parking position. Examples of the registered parking position image button 62 include a parking position image button on which a parking lot at home is registered as the designated parking position as shown in a No. 1 image button 62a, and a parking position image button on which a coin parking having a high parking frequency is registered as the designated parking position as shown in a No. 2 image button 62b. The image displayed on the registered parking position image button 62 is an image captured by, for example, the front camera 12Fr of the vehicle 10 during registration.

Automatic Parking Control to New Parking Position

The automatic parking control performed by the calculation unit 52 when the new registration button 61 is touched will be described with reference to FIGS. 5 to 8.

Figure 5:
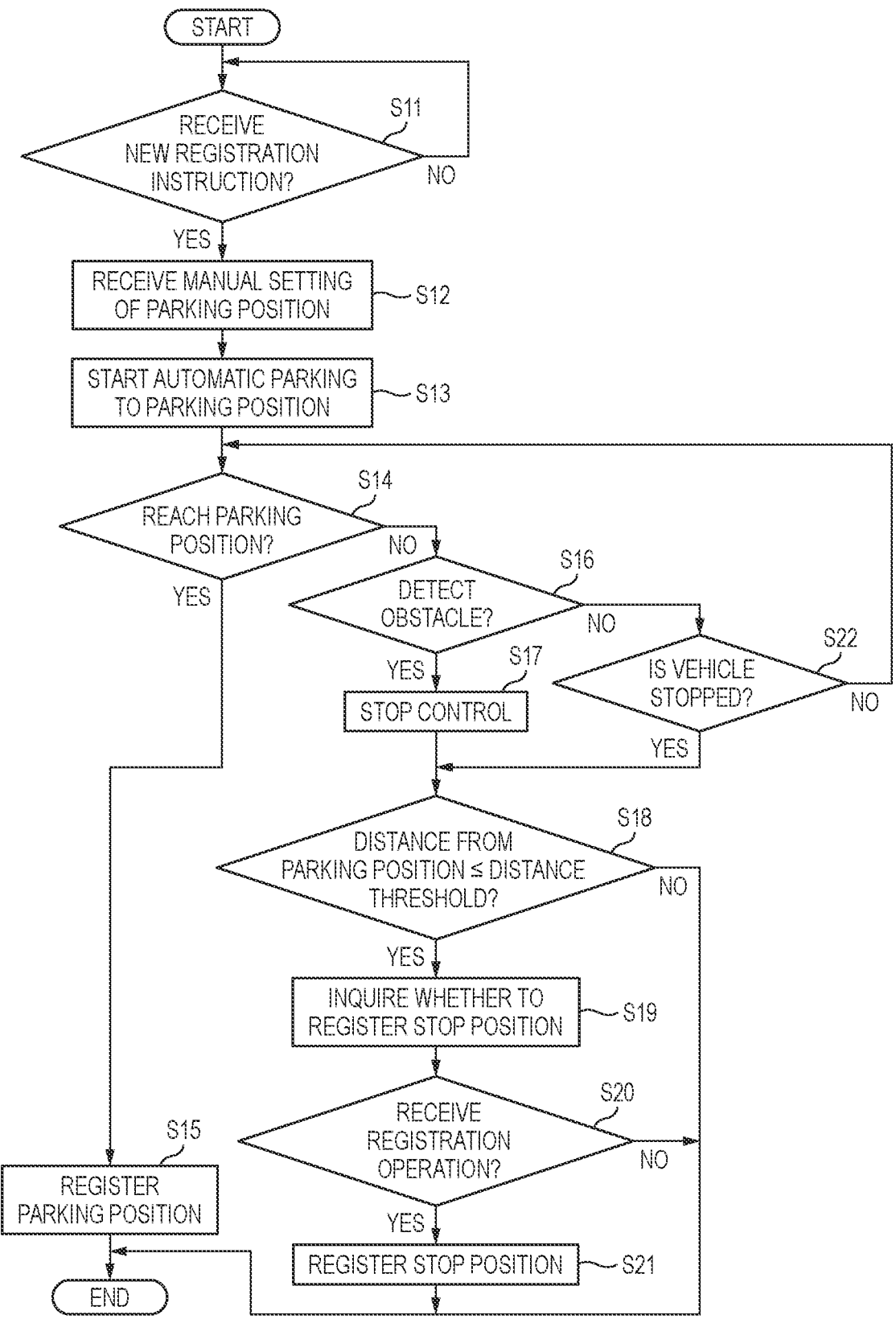
FIG. 5 is a flowchart showing automatic parking control for parking the vehicle at a new parking position.
Figure 6:
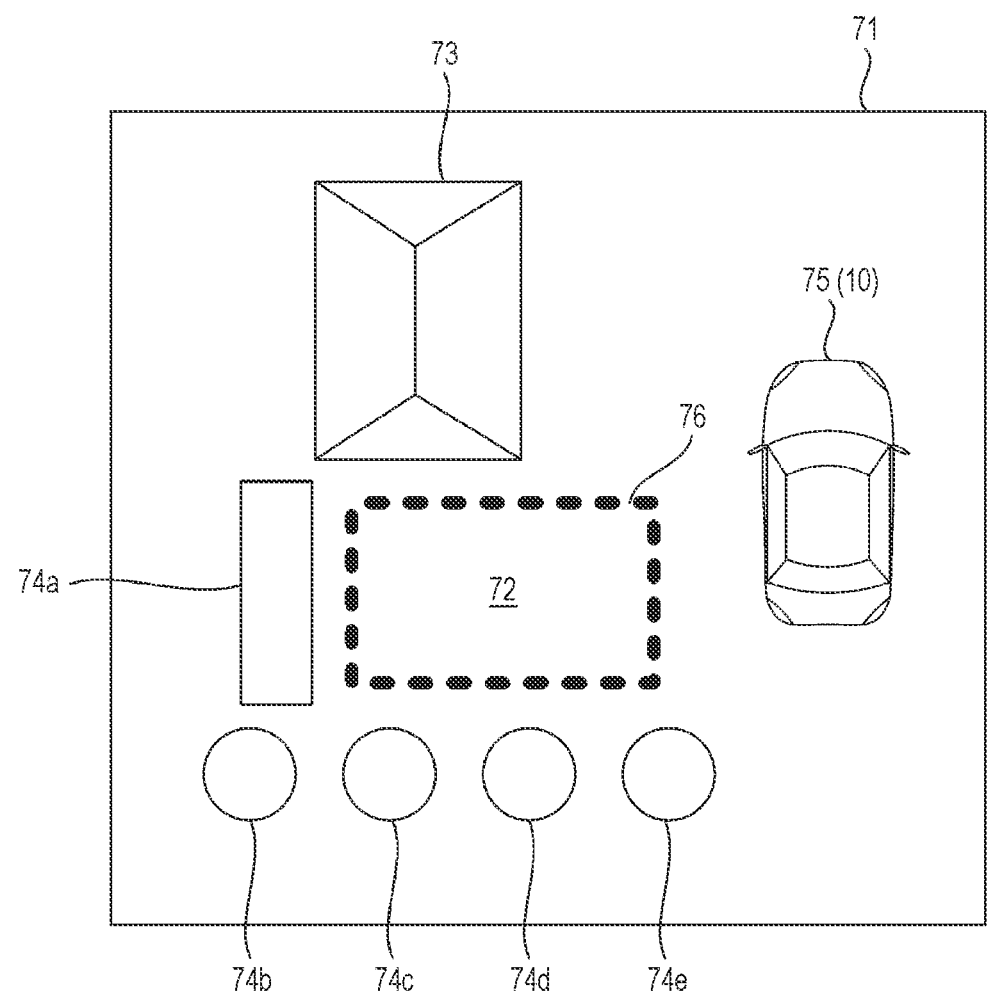
FIG. 6 is a diagram in which a parking position is set in a top view image generated by imaging data of surroundings of the vehicle.
Figure 7:
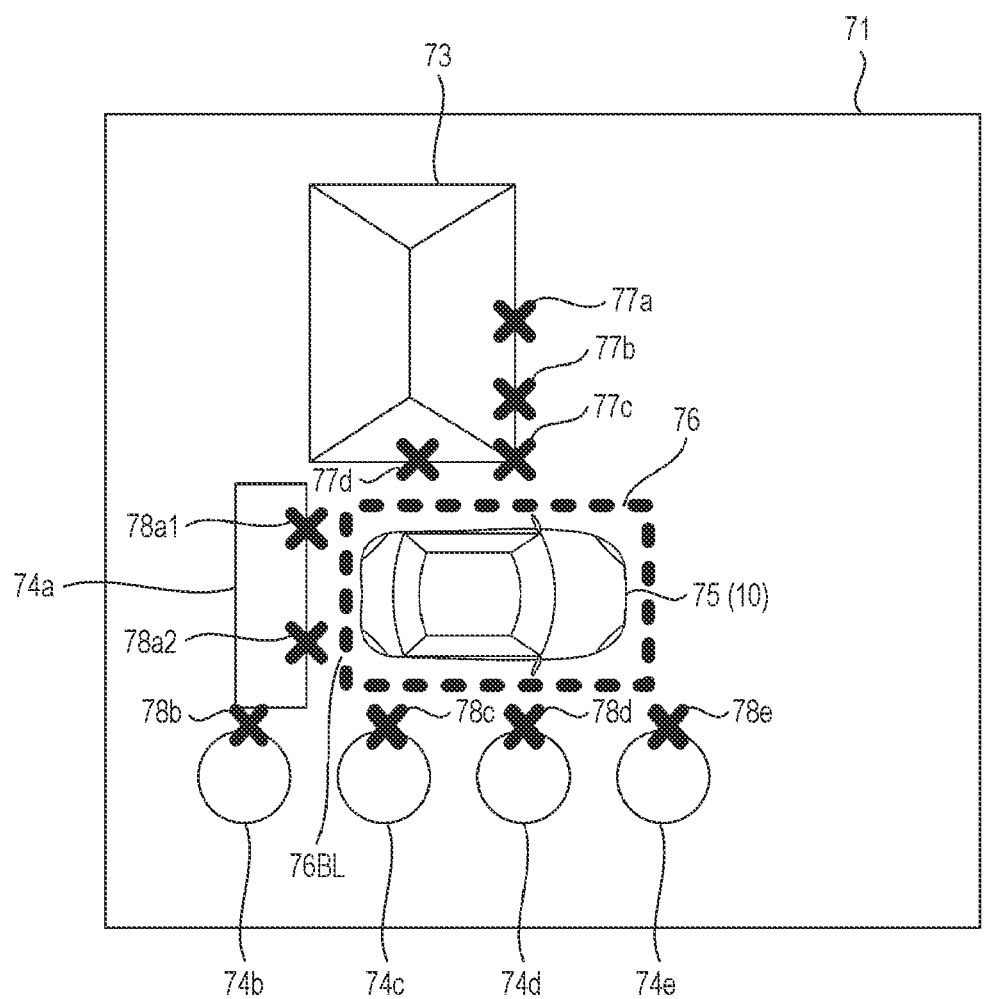
FIG. 7 is a diagram showing features of surroundings with respect to the parking position shown in FIG. 6.
Figure 8:
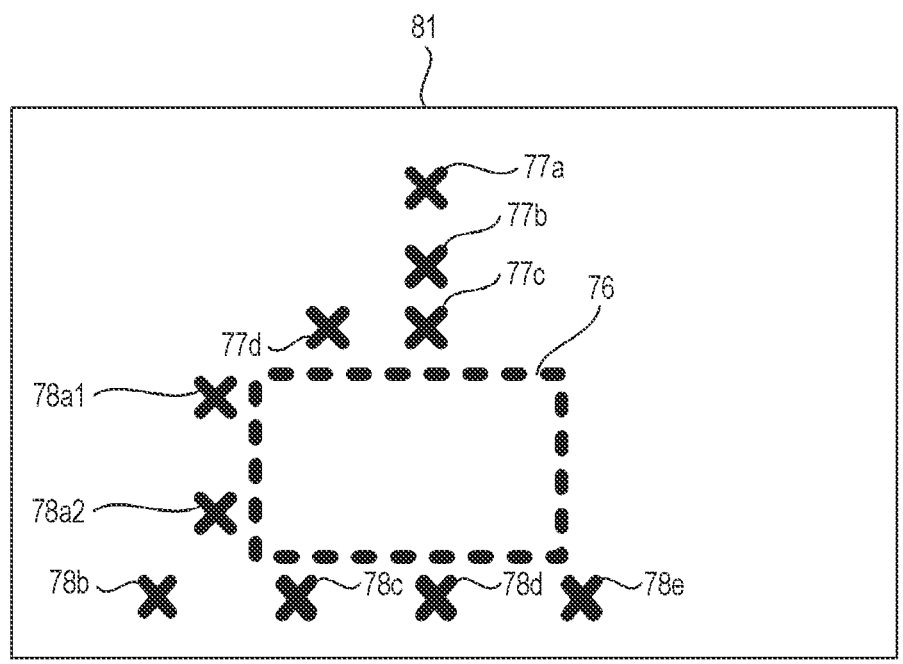
FIG. 8 is a diagram showing an example of a feature map registered for the parking position.

FIG. 5 is a flowchart showing the automatic parking control for parking the vehicle 10 at a new parking position. FIG. 6 is a diagram in which a parking position 76 is set in a top view image 71 (combined image) generated based on the imaging data of the surroundings of the vehicle 10 acquired by the front camera 12Fr, the rear camera 12Rr, the left side camera 12L, and the right side camera 12R. FIG. 7 is a diagram showing features of surroundings with respect to the parking position 76 shown in FIG. 6. FIG. 8 is a diagram showing an example of a feature map registered for the parking position 76. When the new registration button 61 in the image of the automatic parking menu (see FIG. 4) is touched, the calculation unit 52 starts processing shown in FIG. 5.

The calculation unit 52 determines whether a new registration instruction is received, that is, whether the new registration button 61 is touched by the reception unit 57 (step S11).

When the new registration button 61 is not touched (step S11: No) in step S11, the calculation unit 52 repeats the processing in step S11.

When the new registration button 61 is touched in step S11 (step S11: Yes), the calculation unit 52 receives manual setting performed by the driver for setting a parking position for the vehicle 10 by the reception unit 57 (step S12).

For example, the driver of the vehicle 10 stops the vehicle 10 in front of the parking lot at home, and touches the new registration button 61 to register the parking lot as a new designated parking position. Then, the top view image 71 generated based on the imaging data of the surroundings of the vehicle 10 as shown in FIG. 6 is displayed on the touch panel 42 of the vehicle 10. In the top view image 71, the vehicle 10 stopped in front of a parking lot 72 at home is displayed. Further, a residence (building) 73 of the driver, a wall or fence (obstacle) 74a, and a plurality of plantings (obstacles) 74b to 74e are displayed in the top view image 71. The parking lot 72 is provided between the building 73 and obstacles 74a to 74e. The vehicle displayed in the top view image 71 is an image showing a state where the vehicle 10 is viewed from above, and is a vehicle image 75 generated (captured) in advance and stored in the storage unit 54 or the like. The manual setting of the parking position can be performed by touching the parking position 76 having a rectangular shape and showing a region where the vehicle 10 is parked on the touch panel 42 where the top view image 71 is displayed, and slidably moving the vehicle 10 to a target parking position where the vehicle 10 is desired to be parked.

When receiving manual selling of the parking position 76 in step S12, the calculation unit 52 recognizes, by the control unit 58, a surrounding object in a movement path to the set parking position 76 based on the imaging data of the surroundings of the vehicle 10 captured by the front camera 12Fr, the rear camera 12Rr, the left side camera 12L, and the right side camera 12R. Based on a recognition result of the movement path, the calculation unit 52, by the control unit 58, moves the vehicle 10 by a predetermined distance toward a predetermined direction, and starts the automatic parking of the vehicle 10 to the parking position 76 (step S13).

The calculation unit 52 acquires, by the control unit 58, the imaging data of the surroundings of the vehicle 10 imaged by the front camera 12Fr, the rear camera 12Rr, the left side camera 12L, and the right side camera 12R during the automatic parking of the vehicle 10. The calculation unit 52 detects, by the control unit 58, features related to the parking position 76 based on the imaging data of the surroundings of the vehicle 10 acquired during the automatic parking. For example, as in the top view image 71 shown in FIG. 7, the calculation unit 52 detects, by the control unit 58, building features 77a to 77d indicating a position of a contour of the building 73 on a side close to the parking position 76, obstacle features 78a1, 78a2, and 78b to 78e indicating positions of the obstacles 74a to 74e present around the parking position 76, and the like as the features related to the designated parking position 76.

Next, the calculation unit 52 determines, by the control unit 58, whether the vehicle 10 reaches the parking position 76 (step S14). Whether the vehicle 10 reaches the parking position 76 is determined by movement of the vehicle 10 based on the recognition result of the movement path, for example, whether the vehicle 10 moves into the parking position 76, or whether a distance between a rear line 76BL (see FIG. 7) of the parking position 76 imaged by the rear camera 12Rr of the back-in parked vehicle 10 and the rear camera 12Rr is equal to or smaller than a predetermined distance.

When the vehicle 10 reaches the parking position 76 in step S14 (step S14: Yes), the calculation unit 52 newly registers, by the control unit 58, the features related to the parking position 76 acquired during the automatic parking in the storage unit 54 (step S15). Registration of the features related to the parking position 76 may be performed in parallel with the automatic parking control along with start of the automatic parking in step S13.

The parking position 76 and the features thereof are registered as, for example, a feature map 81 shown in FIG. 8. The feature map 81 is registered, for example, as a map indicating a relationship between the building features 77a to 77d as well as the obstacle features 78a1, 78a2, and 78b to 78e detected in the top view image 71 in FIG. 7 and the manually set parking position 76.

When the vehicle 10 does not reach the parking position 76 in step S14 (step S14: No), the calculation unit 52 determines, by the obstacle detection unit 55, whether an obstacle is detected in the movement path of the vehicle 10 during the automatic parking (step S16).

When an obstacle is detected in step S16 (step S16: Yes), the calculation unit 52 performs, by the control unit 58, the stop control of stopping the vehicle 10 that executes the automatic parking (step S17).

Next, the calculation unit 52 determines, by the control unit 58, whether a distance from a stop position of the vehicle 10 stopped in step S17 to the parking position 76 of the vehicle 10 is equal to or smaller than a preset distance threshold (for example, 2.5 m) (step S18). The calculation unit 52 determines, by the control unit 58, for example, whether the distance between the rear camera 12Rr of the vehicle 10 and the rear line 76BL of the parking position 76 when the vehicle 10 is stopped is equal to or smaller than the distance threshold. The distance threshold being set to, for example, 2.5 m will be described later with reference to FIGS. 9 and 10.

When the distance from the parking position 76 is equal to or smaller than the distance threshold in step S18 (step S18: Yes), the calculation unit 52 inquires of the driver, by the control unit 58, whether to register the stop position where the vehicle 11) is stopped as the designated parking position for the vehicle 10 (step S19). A specific situation corresponds to a case where the vehicle 10 is stopped before reaching the parking position 76 designated by the driver in the middle of the automatic parking, and a position where the vehicle 10 is stopped is a position closer to the parking position 76 than the distance threshold preset with respect to the parking position 76. The calculation unit 52 displays a message indicating that "the vehicle 10 is stopped at a position in front of the set parking position. Please confirm whether the position may be registered as the designated parking position" on, for example, the touch panel 42. An inquiry by sound may be made. An answer to the inquiry can be given by, for example, a button operation on the touch panel 42.

Next, the calculation unit 52 determines, by the control unit 58, whether a registration operation from the driver for the inquiry in step S19 is received (step S20).

When the registration operation from the driver is received in step S20 (step S20: Yes), the calculation unit 52 newly registers, by the control unit 58, the stop position where the vehicle 10 is stopped as the designated parking position 76 for the vehicle 10 (step S21). The new registration in this case is similar to the new registration in step S15, and features related to the stop position of the vehicle 10 acquired during the automatic parking are registered as the feature map 81. The feature map 81 is registered as a map indicating the relationship between the building features 77a to 77d as well as the obstacle features 78a1, 78a2, and 78b to 78e and the stop position of the vehicle 10.

On the other hand, when the distance from the parking position 76 is not equal to or smaller than the distance threshold in step S18 (step S18: No), the calculation unit 52 ends, by the control unit 58, the present automatic parking control. A specific situation corresponds to a case where the vehicle 10 is stopped before reaching the parking position 76 designated by the driver in the middle of the automatic parking, and a position where the vehicle 10 is stopped is a position farther from the parking position 76 than the distance threshold preset with respect to the parking position 76. For example, here, after waiting for restart of the automatic parking of the vehicle 10, that is, after waiting for the automatic parking button 60 being touched again by the driver, if the automatic parking is restarted, the processing may return to step S14, and the processing in steps may be performed. However, when the restart is not performed even if a certain period of time elapses after waiting for the restart of the automatic parking, when the side brake of the vehicle 10 is applied, or when power of the vehicle 10 is turned off, the present automatic parking control is ended.

On the other hand, when the registration operation from the driver is not received in step S20 (step S20: No), the calculation unit 52 ends, by the control unit 58, the present automatic parking control. The present processing being returned to step S14 and the processing in steps being performed if the restart is performed after waiting for the restart of the automatic parking, and the present automatic parking control being ended when the automatic parking is not restarted even if a certain period of time elapses are similar to a case of step S18: No.

On the other hand, when an obstacle is not detected in step S16 (step S16: No), the calculation unit 52 determines, by the operation detection unit 56, whether the stop operation of the vehicle 10 is performed and the vehicle 10 is stopped in the automatic parking (step S22).

When the vehicle 10 is not stopped in step S22 (step S22: No), the calculation unit 52 returns to step S14 and executes the processing in steps.

When the vehicle 10 is stopped in step S22 (step S22: Yes), the calculation unit 52 proceeds to step S18 and executes the processing in steps. A specific situation corresponds to a case where the vehicle 10 is stopped before reaching the parking position 76 designated by the driver in the middle of the automatic parking, and the stop is because of a brake operation of the driver.

Accordingly, the parking position 76 designated by the driver or the stop position of the vehicle 10 is registered in the storage unit 54 as the designated parking position including the registered features (feature map), and is displayed on the automatic parking menu (see FIG. 4) as one of the registered parking position image buttons 62.

Automatic Parking Control on Inclined Parking Position

An example of the automatic parking control performed by the calculation unit 52 when the vehicle 10 is parked at an inclined parking position will be described below.

Figure 9:
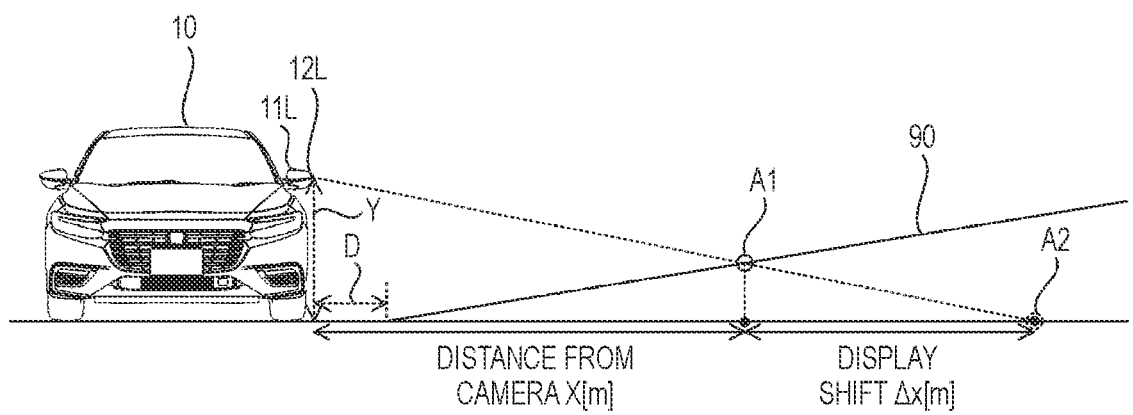
FIG. 9 is a diagram showing a state where a left side camera of the vehicle images an upward inclined surface.
Figure 10:
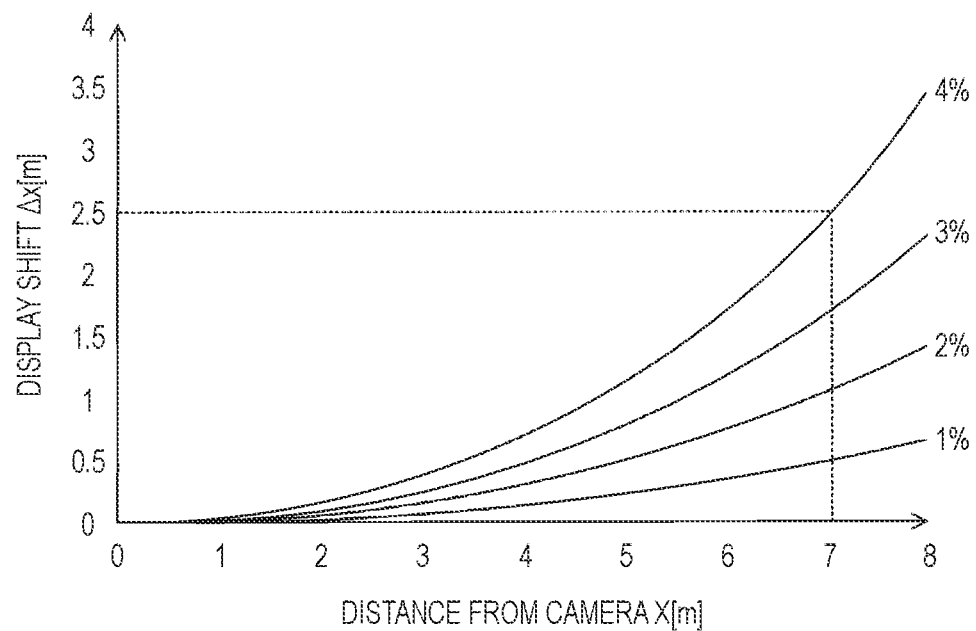
FIG. 10 is a graph showing a relationship between a distance from the camera to an imaged object and a display shift generated on the top view image when a gradient of the inclined surface shown in FIG. 9 is changed.

First, a display shift of an imaged object generated in the top view image generated based on imaging data when a camera mounted on the vehicle 10 images an inclined surface on which the vehicle 10 is parked will be described with reference to FIGS. 9 and 10. FIG. 9 is a diagram showing a state where the left side camera 12L mounted on the left side mirror 11L of the vehicle 10 images an upward inclined surface 90 located on the left side of the vehicle 10. As shown in FIG. 9, the vehicle 10 is stopped at a flat position. The left side camera 12L of the vehicle 10 is mounted on a position having a height Y=1 m from ground. Further, the vehicle 10 is parked such that the left side camera 12L is separated from an inclination start point of the inclined surface 90 by a distance D=0.5 m.

In such a situation, when the imaged object of the left side camera 12L is an object A1 on the inclined surface 90, a distance from the left side camera 12L to the object A1 is X [m]. However, when the top view image is generated based on imaging data imaged by the left side camera 12L, it is impossible to recognize that the inclined surface 90 is inclined in the generated top view image. Therefore, the object A1 is recognized as an object A2 present at a position of X+Δx [m] that is different by a display shift Δx [m] on the top view image.

As described above, when the inclined surface 90 is imaged by the camera of the vehicle 10 stopped at a flat position, the imaged object on the inclined surface 90 recognized by the top view image based on the imaging data of the camera is recognized as an object at a shifted position different from an actual position according to a gradient % of the inclined surface 90. This is because the imaged object imaged by the camera is drawn on the top view image as an object present on a surface on which the vehicle 10 is stopped (in this case, on the flat surface). FIG. 10 is a graph showing a relationship between the distance X from the camera to the imaged object and the display shift Δx generated on the top view image when the gradient % of the inclined surface 90 is changed. As shown in FIG. 10, the larger the distance X from the camera to the imaged object is, the larger the display shift Δx is. Similarly, the larger the gradient % of the inclined surface 90 is, the larger the display shift Δx is. For example, when the distance X from the camera to the imaged object=7 m, the display shift Δx=0.5 m when the gradient of the inclined surface 90 is 1%, the display shift Δx=1.0 m when the gradient of the inclined surface 90 is 2%, the display shift Δx=1.6 in when the gradient of the inclined surface 90 is 3%, and the display shift Δx=2.5 in when the gradient of the inclined surface 90 is 4%.

Figure 11:
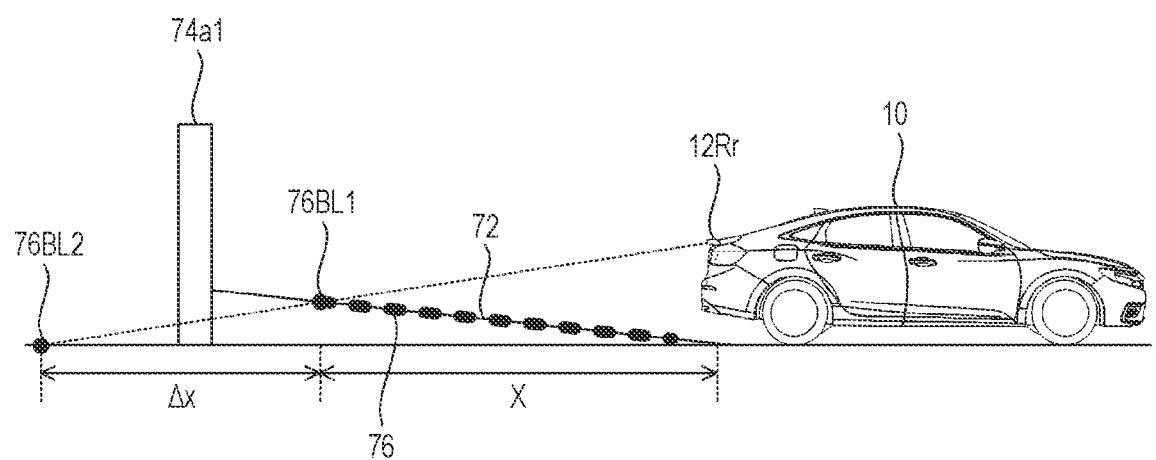
FIG. 11 is a diagram showing a state where a rear camera of the vehicle images the parking position having the upward inclined surface.
Figure 12:
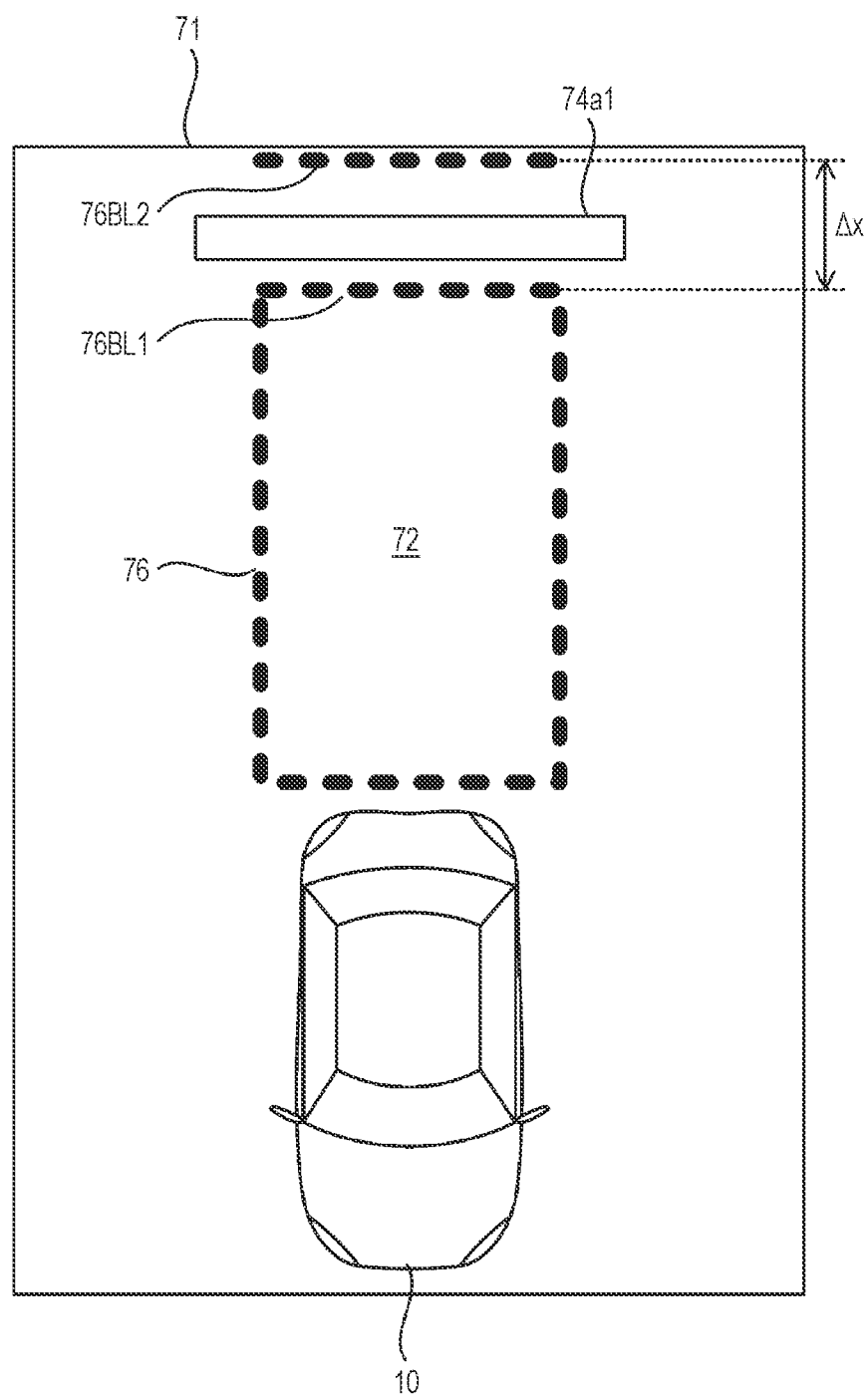
FIG. 12 is a diagram showing a top view image of the parking position imaged in FIG. 11.

Next, a first example of the automatic parking control performed by the calculation unit 52 when the vehicle 10 is newly parked at the parking position 76 provided on the inclined parking lot 72 will be described with reference to FIGS. 11 to 16. FIG. 11 is a diagram showing a state where the rear camera 12Rr of the vehicle 10 images the parking position 76 provided on the parking lot 72 having the upward inclined surface. FIG. 12 is a diagram showing the top view image 71 generated based on imaging data obtained by imaging the parking position 76 of the parking lot 72 having the upward inclined surface shown in FIG. 11.

As shown in FIGS. 11 and 12, in a state where the vehicle 10 is stopped at the flat position, the vehicle 10 receives designation of the parking position 76 where the vehicle 10 is parked from the driver, and images the parking position 76 provided on the parking lot 72 having the upward inclined surface by the rear camera 12Rr. Therefore, for example, the rear line 76BL1 of the parking position 76 is recognized as a rear line 76BL2 shifted rearward by the display shift Δx on the top view image. The amount of the display shift Δx varies depending on the distance X from the rear camera 12Rr to the rear line 76BL1 and the gradient % of the parking lot 72 (parking position 76) as described above.

Figure 13:
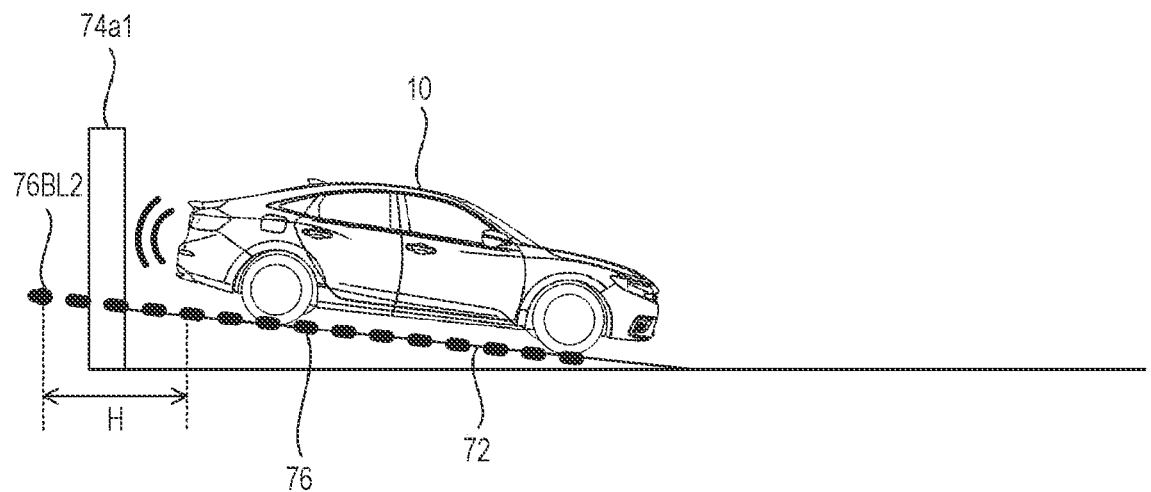
FIG. 13 is a diagram showing a state where an obstacle is detected and the vehicle is stopped while automatically parking the vehicle at the parking position shown in FIG. 11.
Figure 14:
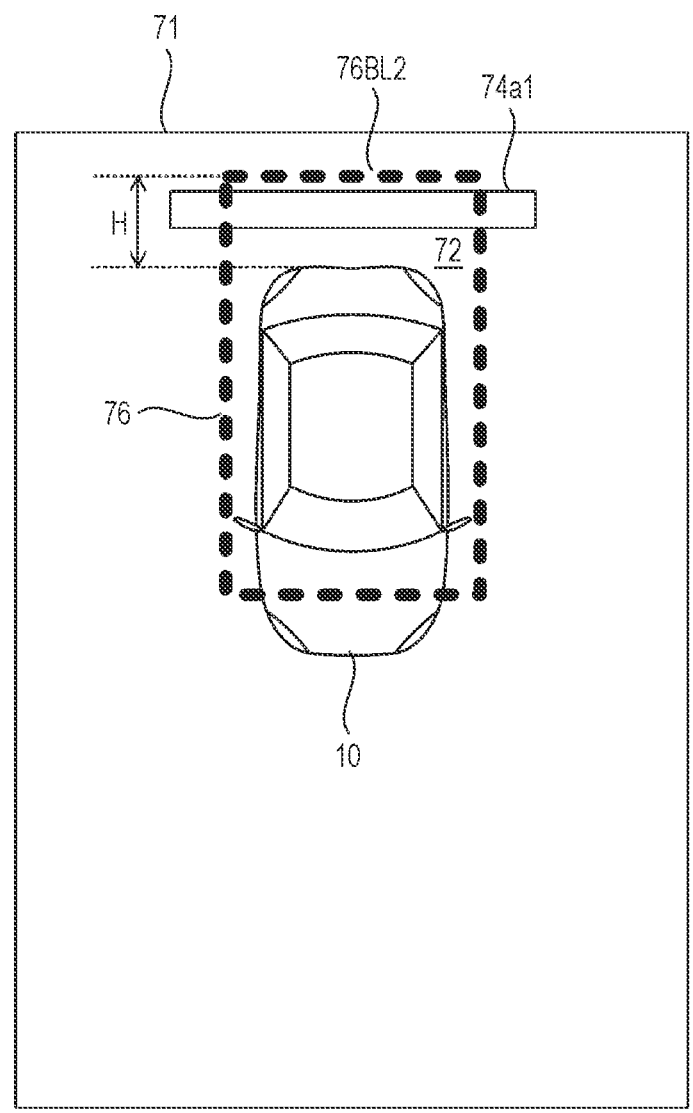
FIG. 14 is a diagram showing the top view image of the vehicle and the parking position shown in FIG. 13.

FIG. 13 is a diagram showing a state where an obstacle 74a1 is detected and the vehicle 10 is stopped while automatically parking the vehicle 10 at the parking position 76 provided on the parking lot 72 having the upward inclined surface. FIG. 14 is a diagram showing the top view image 71 of the vehicle 10 and the parking position 76 shown in FIG. 13. FIGS. 13 and 14 are diagrams corresponding to the processing in steps S14, S16, S17, and S18 in the flowchart in FIG. 5 described above.

As shown in FIGS. 13 and 14, the vehicle 10 is moved by the back-in parking on the parking lot 72 having the upward inclined surface. Regarding the vehicle 10, based on a recognition result of a movement path to the designated parking position 76, for example, the vehicle 10 is moved backward with the rear line 76BL2 of the parking position 76 as a rear stop target position for the vehicle 10. However, since the parking lot 72 is inclined, the vehicle 10 recognizes the position of the rear line 76BL2 of the parking position 76 as a position shifted rearward by the display shift Δx from the position of the actual rear line 76BL1 as described above. Therefore, the rear line 76BL2 recognized by the vehicle 10 moved backward on the parking lot 72 having the upward inclined surface is recognized as the rear line 76BL2 present behind the obstacle 74a1. Accordingly, the vehicle 10 recognizes that the obstacle 74a1 is present in the movement path of the vehicle 10 before reaching the rear line 76BL2 that is the rear stop target position. Regarding the vehicle 10, the vehicle 10 is stopped before reaching the designated parking position 76 by detecting the obstacle 74a1.

The vehicle 10 measures a distance H from the rear camera 12Rr of the stopped vehicle 10 to the rear line 76BL2 of the parking position 76. It is determined whether the measured distance H from the rear line 76BL2 of the parking position 76 is equal to or smaller than a preset distance threshold 2.5 m. The distance threshold 2.5 m is a value set based on the measurement results in FIGS. 9 and 10 described above, and is a value including the display shift Δx that can be generated when the gradient of the inclined surface 90 is 4%.

Figure 15:
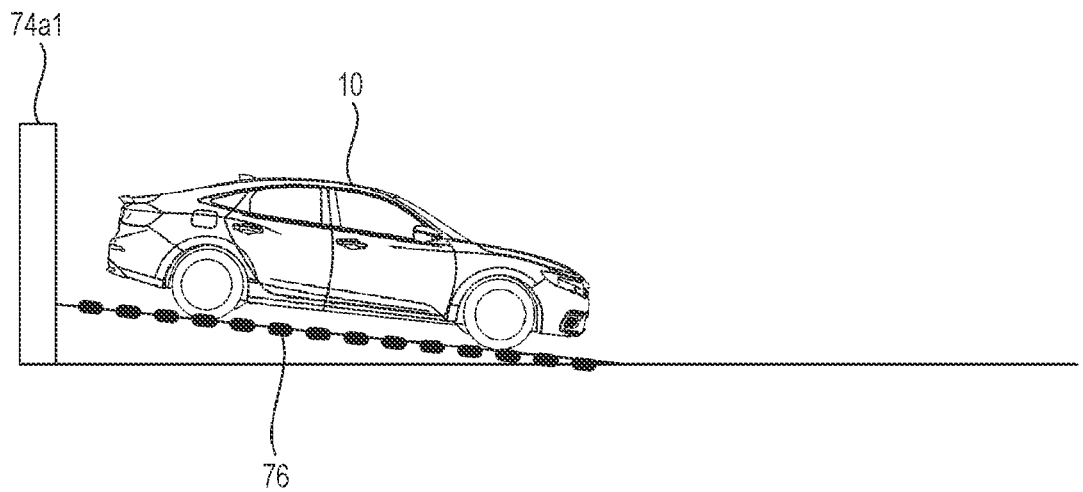
FIG. 15 is a diagram showing an example of the vehicle and the parking position when the stop position of the vehicle shown in FIG. 13 is registered as the designated parking position.
Figure 16:
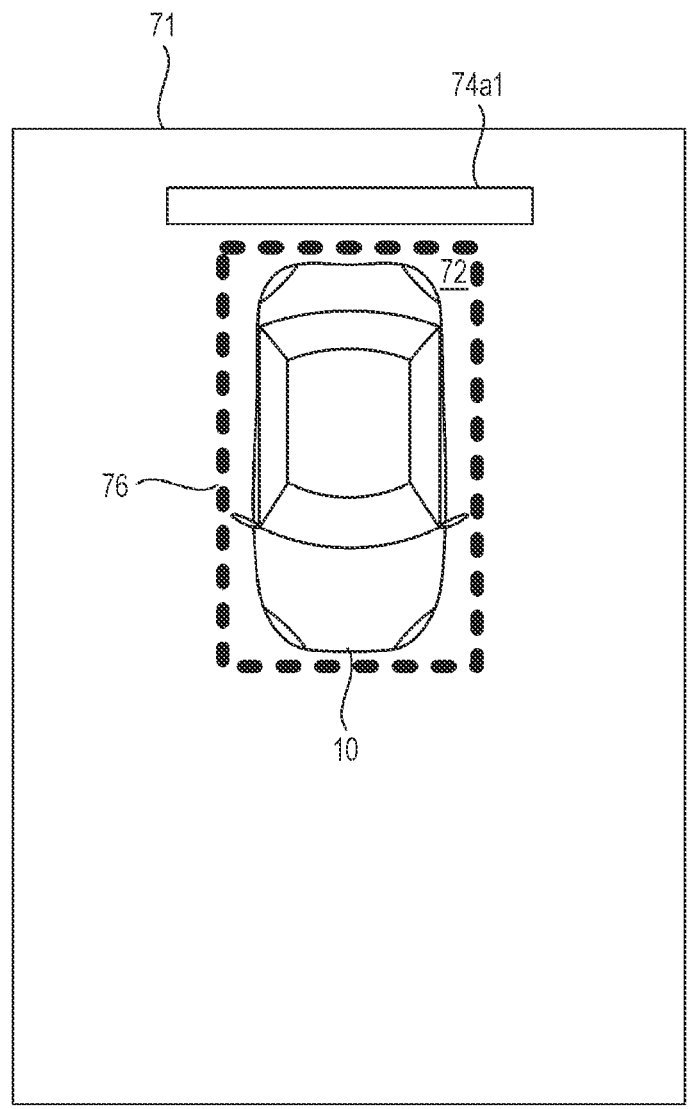
FIG. 16 is a diagram showing the top view image of the vehicle and the parking position shown in FIG. 15.

FIG. 15 is a diagram showing an example of the vehicle 10 and the parking position 76 newly registered in the storage unit 54 when the distance H from the rear line 76BL2 of the parking position 76 measured in FIGS. 13 and 14 is equal to or smaller than the distance threshold 2.5 m. FIG. 16 is a diagram showing the top view image 71 of the vehicle 10 and the parking position 76 shown in FIG. 15. FIGS. 15 and 16 are diagrams corresponding to the processing in step S21 in the flowchart in FIG. 5 described above.

When the distance H from the rear line 76BL2 of the parking position 76 measured in FIGS. 13 and 14 is equal to or smaller than the distance threshold 2.5 m, the vehicle 10 determines that the distance H is due to the display shift generated by the parking lot 72 being inclined, and that the vehicle 10 can actually be parked at the designated parking position 76. Therefore, as shown in FIGS. 15 and 16, the vehicle 10 performs correction such that a state is formed in which the position of the parking position 76 is moved forward by an amount corresponding to the distance H, and the vehicle 10 is parked in the parking position 76. The vehicle 10 newly registers the stop position where the vehicle 10 is stopped as the designated parking position. Accordingly, the display shift that can be generated on the captured image of the camera when the vehicle 10 is automatically parked at the inclined parking position 76 can be improved, and can be registered as effective parking position information for the automatic parking control.

Figure 17:
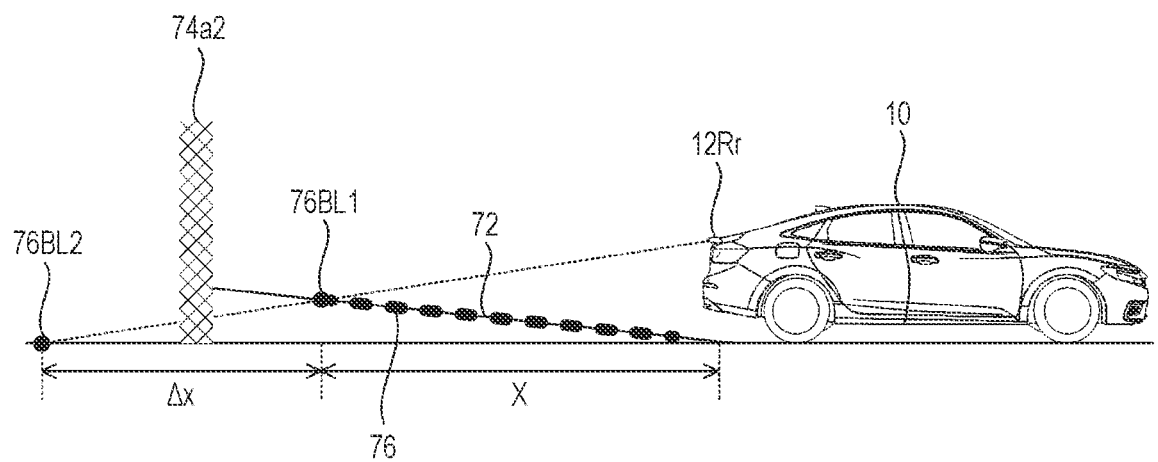
FIG. 17 is a diagram showing a state where a rear camera of the vehicle images the parking position having the upward inclined surface.
Figure 18:
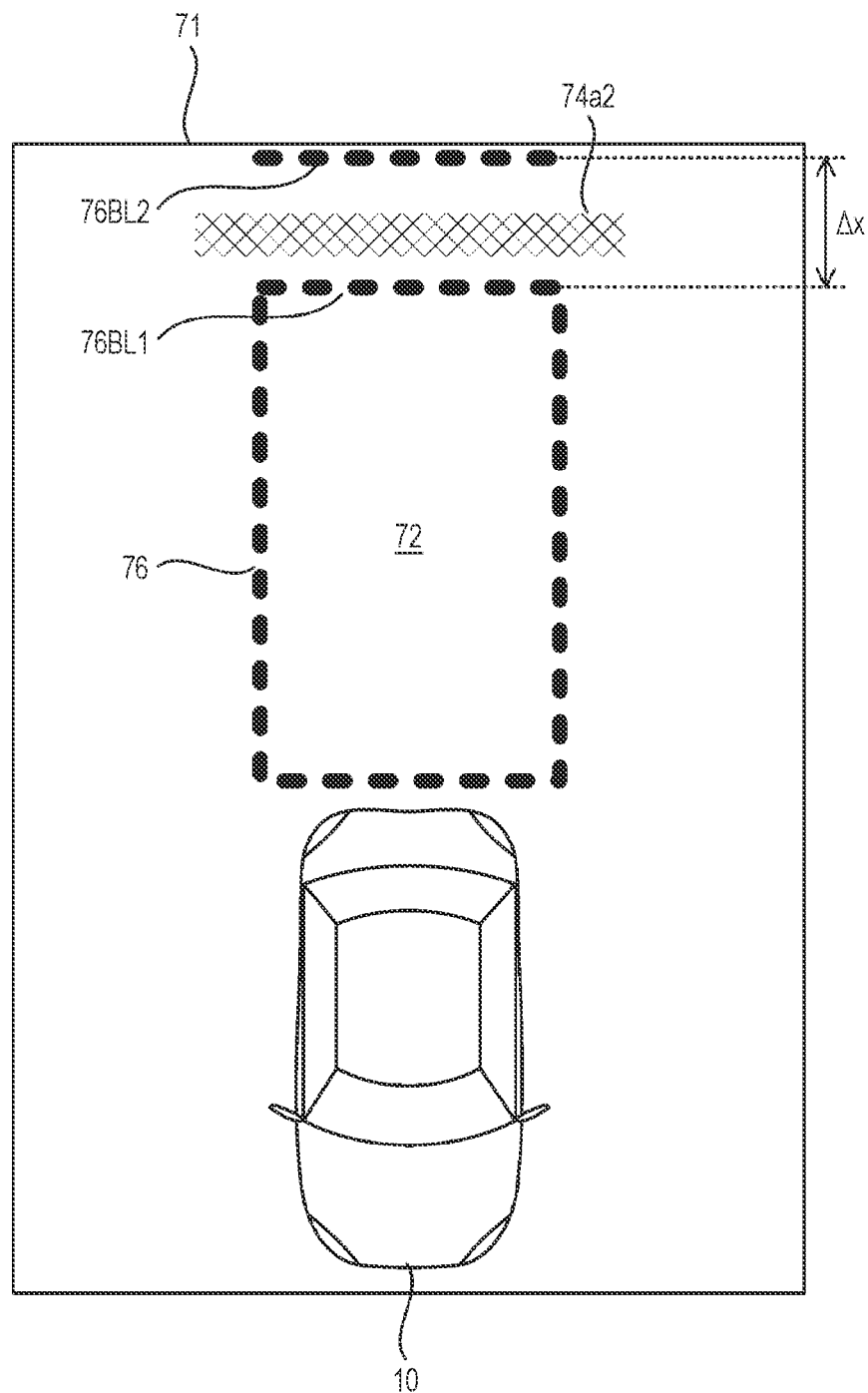
FIG. 18 is a diagram showing the top view image of the parking position imaged in FIG. 17.

Next, a second example of the automatic parking control performed by the calculation unit 52 when the vehicle 10 is newly parked at the parking position 76 provided on the inclined parking lot 72 will be described with reference to FIGS. 17 to 22. FIG. 17 is a diagram showing a state where the rear camera 12Rr of the vehicle 10 images the parking position 76 provided on the parking lot 72 having the upward inclined surface. FIG. 18 is a diagram showing the top view image 71 generated based on imaging data obtained by imaging the parking position 76 of the parking lot 72 having the upward inclined surface shown in FIG. 17.

As shown in FIGS. 17 and 18, since the vehicle 10 is in a state of being stopped at a flat position, the vehicle 10 recognizes the rear line 76BL1 of the parking position 76 imaged by the rear camera 12Rr as the rear line 76BL2 shifted rearward by the display shift Δx on the top view image. This point is similar to that in the first example described with reference to FIGS. 11 and 12.

Figure 19:
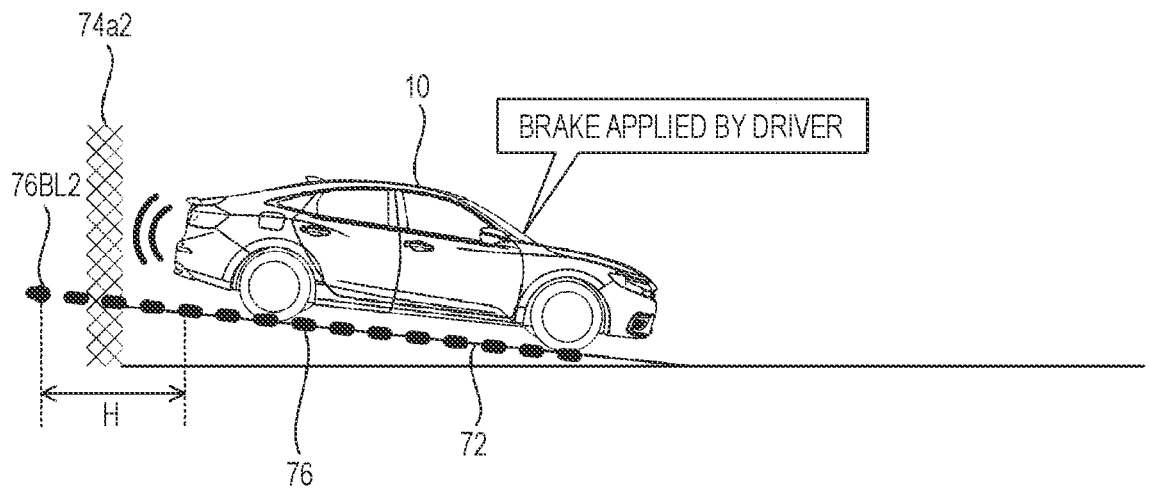
FIG. 19 is a diagram showing a state where the vehicle is stopped in response to a stop operation of a driver while automatically parking the vehicle at the parking position shown in FIG. 17.
Figure 20:
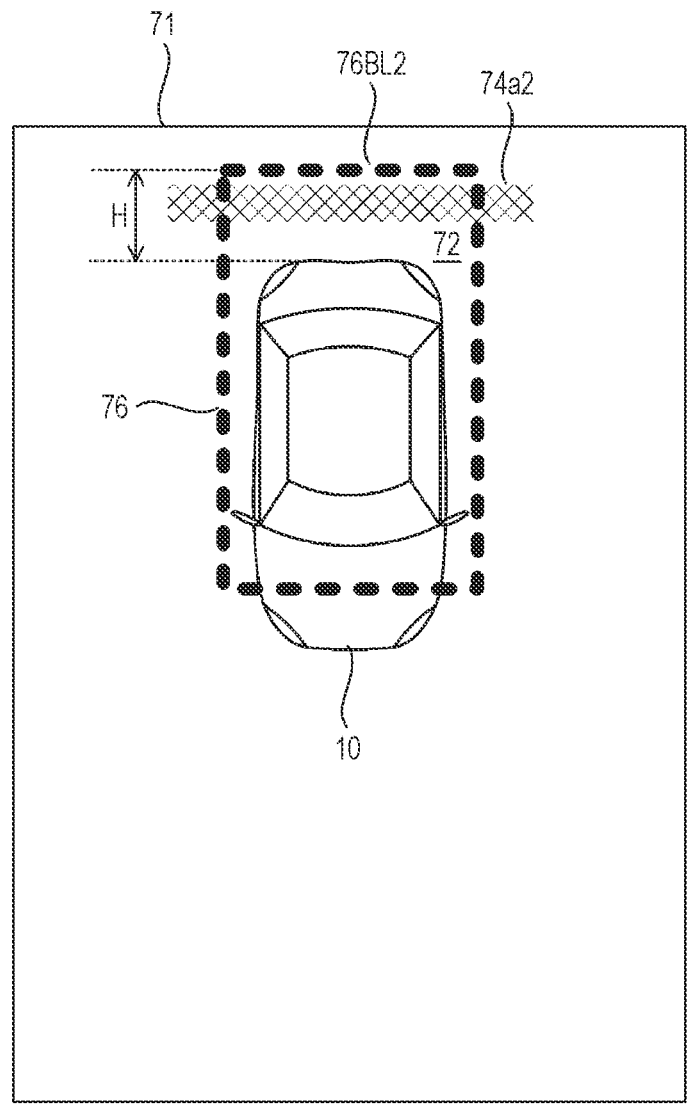
FIG. 20 is a diagram showing the top view image of the vehicle and the parking position shown in FIG. 19.

FIG. 19 is a diagram showing a state where the vehicle 10 is stopped in response to a brake operation of the driver while automatically parking the vehicle 10 at the parking position 76 provided on the parking lot 72 having the upward inclined surface. FIG. 20 is a diagram showing the top view image 71 of the automatically parked vehicle 10 and the parking position 76 in FIG. 19. It is assumed that an obstacle 74a2 in the second example is an obstacle (for example, a fence or the like) that cannot be detected by the sensor group 16 (the sonars or the radars) mounted on the vehicle 10. FIGS. 19 and 20 are diagrams corresponding to the processing in steps S14, S16, S22, and S18 in the flowchart in FIG. 5 described above.

As shown in FIGS. 19 and 20, the vehicle 10 is moved by the back-in parking on the parking lot 72 having the upward inclined surface. Regarding the vehicle 10, based on a recognition result of the movement path to the designated parking position 76, for example, the vehicle 10 is moved backward with the rear line 76BL2 of the parking position 76 as the rear stop target position for the vehicle 10. However, since the parking lot 72 is inclined, the vehicle 10 recognizes the position of the rear line 76BL2 of the parking position 76 as the position shifted rearward by the display shift Δx from the position of the actual rear line 76BL1 as described above. Accordingly, the vehicle 10 recognizes the rear line 76BL2 of the parking position 76 as the rear line 76BL2 located behind the obstacle 74a2. Since the sensor group 16 cannot detect the obstacle 74a2 in the present second example, the driver of the vehicle 10 recognizes the obstacle 74a2 before the vehicle 10 reaches the rear line 76BL2 that is the rear stop target position, determines that the obstacle 74a2 may be in contact with the vehicle 10, and stops the vehicle 10 by the brake operation.

The vehicle 10 measures the distance H from the rear camera 12Rr of the stopped vehicle 10 to the rear line 76BL2 of the parking position 76. It is determined whether the measured distance H from the rear line 76BL2 of the parking position 76 is equal to or smaller than the preset distance threshold 2.5 m. Similar to the first example described above, the distance threshold 2.5 m is a value including the display shift Δx that can be generated when the gradient of the parking lot 72 where the vehicle 10 is parked is 4%.

Figure 21:
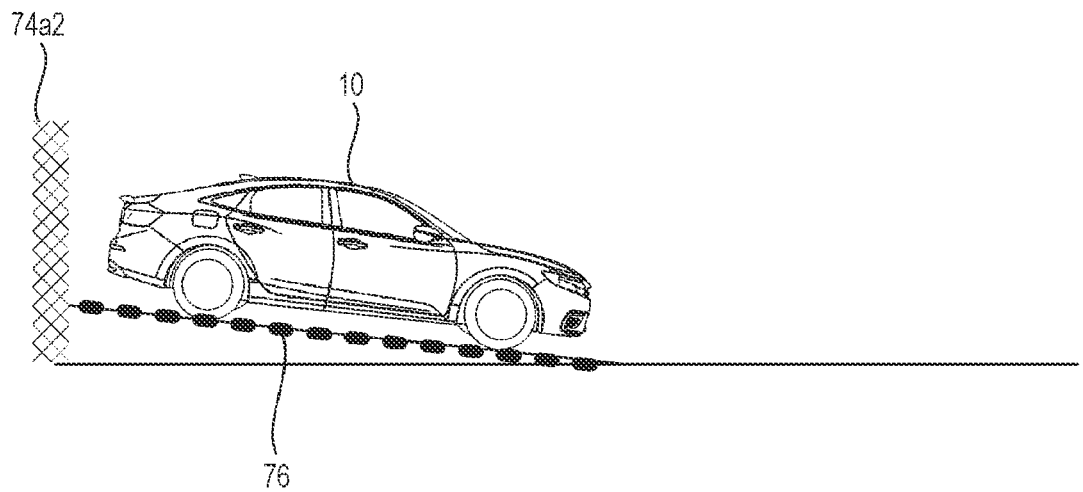
FIG. 21 is a diagram showing an example of a corrected parking position when the stop position of the vehicle shown in FIG. 19 is registered as the designated parking position.
Figure 22:
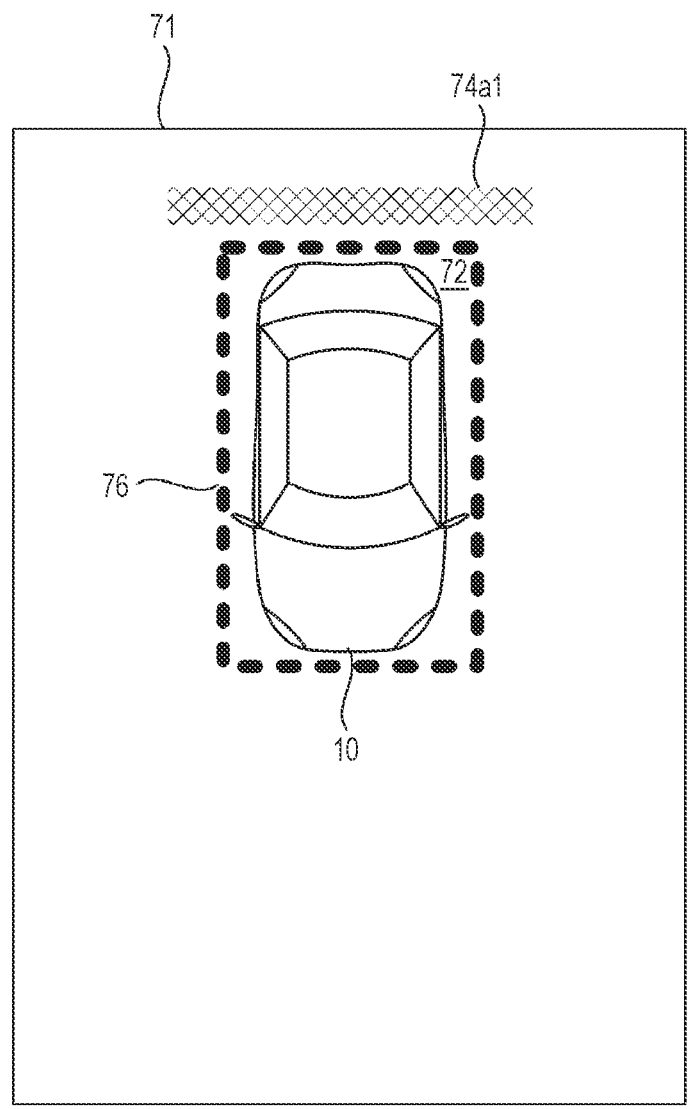
FIG. 22 is a diagram showing the top view image of the vehicle and the parking position shown in FIG. 21.

FIG. 21 is a diagram showing an example of the vehicle 10 and the parking position 76 newly registered in the storage unit 54 when the distance H from the rear line 76BL2 of the parking position 76 measured in FIGS. 19 and 20 is equal to or smaller than the distance threshold 2.5 m. FIG. 22 is a diagram showing the top view image 71 of the vehicle 10 and the parking position 76 shown in FIG. 21. FIGS. 21 and 22 are diagrams corresponding to the processing in step S21 in the flowchart in FIG. 5 described above.

When the distance H from the rear line 76BL2 is equal to or smaller than the distance threshold 2.5 m, the vehicle 10 determines that the distance H is due to the display shift generated by the parking lot 72 being inclined, and that the vehicle 10 can actually be parked at the designated parking position 76. Therefore, as shown in FIGS. 21 and 22, the vehicle 10 performs correction such that a state is formed in which the position of the parking position 76 is moved forward by an amount corresponding to the distance H, and the vehicle 10 is parked in the parking position 76. The vehicle 10 newly registers the stop position where the vehicle 10 is stopped as the designated parking position.

As described above, when the vehicle 10 is stopped after the automatic parking control is started and before the vehicle 10 reaches the designated parking position 76, the control unit 58 of the control device registers the stop position where the vehicle 10 is stopped as the designated parking position. According to the configuration, for example, since the stop position of the vehicle 10 when designation of a position where the vehicle 10 is parked is received from the driver is the flat position, the designated parking position 76 is the parking position 76 provided on the parking lot 72 having the upward inclined surface, and the inclination of both positions is different, even if there is a difference (display shift Δx) between the actual parking position 76 (rear line 76BL1) intended by the driver and the parking position 76 (rear line 76BL2) recognized by reception of selection from the driver, it is possible to register the stop position where the vehicle 10 is actually stopped as the correct designated parking position. Accordingly, it is possible to prevent a situation where the recognized parking position 76 of the vehicle 10 and the recognized surrounding objects present around the vehicle 10 may overlap with each other on the top view image 71 generated based on the imaging data during the automatic parking control since the parking position 76 where the vehicle 10 is parked is an inclined position, and where the designated parking position cannot be registered, so that usability is improved.

When the vehicle 10 is stopped in response to the obstacle 74a1 being detected after the automatic parking control is started and before the vehicle 10 reaches the designated parking position 76, the control unit 58 registers the stop position where the vehicle 10 is stopped as the designated parking position. According to the configuration, for example, even if there is a difference based on the display shift Δx between the actual rear line 76BL1 of the parking position 76 intended by the driver and the rear line 76BL2 of the parking position 76 recognized by reception of selection from the driver since the designated parking position 76 is provided on the parking lot 72 having the upward inclined surface, it is possible to register the stop position of the vehicle 10 stopped due to the obstacle 74a1 present around the vehicle 10 being detected as the correct designated parking position by correcting the display shift Δx. Accordingly, as described above, it is possible to prevent a situation where the recognized parking position 76 of the vehicle 10 and the recognized obstacle 74a1 present around the vehicle 10 may overlap with each other and the designated parking position cannot be registered, so that the usability is improved.

When the vehicle 10 is stopped since the driver performs the stop operation of the vehicle 10 after the automatic parking control is started and before the vehicle 10 reaches the designated parking position 76, the control unit 58 registers the stop position where the vehicle 10 is stopped as the designated parking position. According to the configuration, for example, even if there is a difference based on the display shift Δx between the actual rear line 76BL1 of the parking position 76 intended by the driver and the rear line 76BL2 of the parking position 76 recognized by reception of selection from the driver since the designated parking position 76 is provided on the parking lot 72 having the upward inclined surface, it is possible to register the stop position where the driver notices the obstacle 74a2 and performs the brake operation to stop the vehicle 10 as the correct designated parking position by correcting the display shift Δx. Accordingly, as described above, it is possible to prevent a situation where the recognized parking position 76 of the vehicle 10 and the recognized obstacle 74a2 present around the vehicle 10 may overlap with each other and the designated parking position cannot be registered, so that the usability is improved.

When the vehicle 10 is stopped after the automatic parking control is started and before the vehicle 10 reaches the designated parking position 76, and the distance from the stop position where the vehicle 10 is stopped to the rear line 76BL2 of the parking position 76 recognized by the reception of the selection from the driver is smaller than the preset distance threshold (for example, 2.5 m), the control unit 58 registers the stop position where the vehicle 10 is stopped as the designated parking position. According to the configuration, by providing the distance threshold, even if the display shift Δx is generated at the parking position 76 due to the vehicle 10 being parked at the parking position 76 of the inclined parking lot 72, it is possible to register the stop position where the vehicle 10 is stopped as the correct designated parking position. Further, it is possible to prevent a situation where a stop position greatly different from the parking position 76 of the vehicle 10 when selection is received from the driver may be registered as the designated parking position.

Modification of Automatic Parking Control on New Parking Position

A modification of the automatic parking control performed by the calculation unit 52 when the new registration button 61 is touched will be described with reference to a flowchart in FIG. 23.

Figure 23:
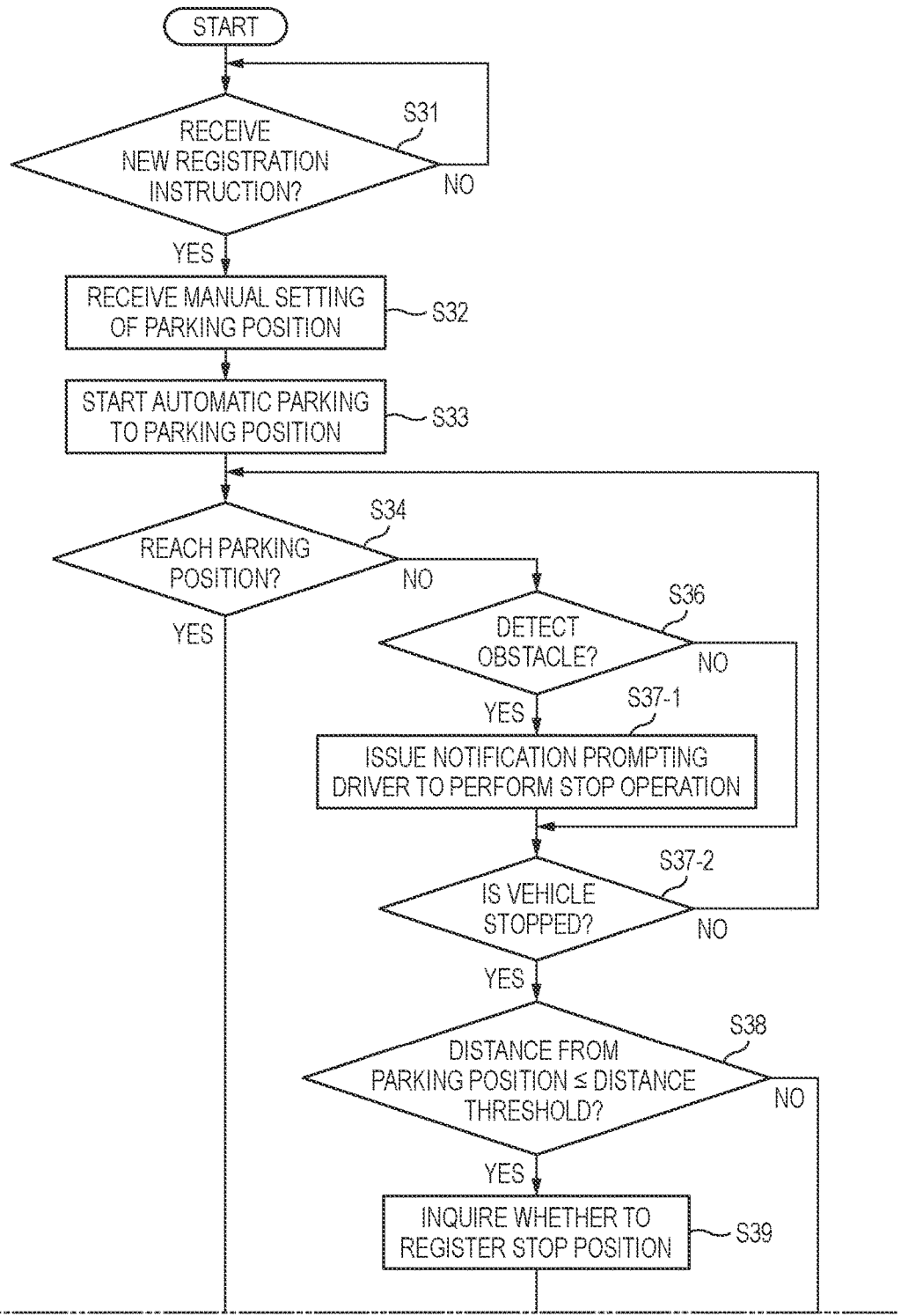
FIG. 23 is a flowchart showing a modification of the automatic parking control for parking the vehicle at a new parking position.

As shown in FIG. 23, in the automatic parking control according to the modification, processing from step S31 to step S36 is similar to the processing from step S11 to step S16 of the automatic parking control shown in FIG. 5. Further, in the automatic parking control according to the modification, processing from step S38 to step S41 is similar to the processing from step S18 to step S21 of the automatic parking control shown in FIG. 5. Therefore, description of the processing in these steps will be omitted.

When an obstacle is detected in step S36 (step S36: Yes), the calculation unit 52 issues, by the control unit 58, a notification prompting the driver to perform the stop operation of the vehicle 10 (step S37-1).

Next, the calculation unit 52 determines, by the operation detection unit 56, whether the stop operation of the vehicle 10 is performed in the automatic parking and the vehicle 10 is stopped (step S37-2).

On the other hand, when an obstacle is not detected in step S36 (step S36: No), the calculation unit 52 proceeds to step S37-2, and determines, by the operation detection unit 56, whether the stop operation of the vehicle 10 is performed and the vehicle 10 is stopped (step S37-2).

When the vehicle 10 is not stopped in step S37-2 (step S37-2: No), the calculation unit 52 returns to step S34 and executes the processing in steps.

When the vehicle 10 is stopped in step S37-2 (step S37-2: Yes), the calculation unit 52 determines, by the control unit 58, whether a distance from the stop position of the stopped vehicle 10 to the parking position 76 of the vehicle 10 is equal to or smaller than the preset distance threshold (for example, 2.5 m) (step S38).

As in the modification of the automatic parking control described above, when the obstacle 74a1 is detected before the vehicle 10 reaches the parking position 76, even if the notification prompting the driver to perform the stop operation of the vehicle 10 is issued, similar to the embodiment described above, it is possible to register the stop position where the vehicle 10 is actually stopped as the correct designated parking position. Accordingly, even if the vehicle 10 is parked on the inclined parking lot 72, the parking position 76 can be appropriately registered.

The embodiment of the present invention has been described above, but the present invention is not limited to the embodiment described above, and modifications, improvements, and the like can be made as appropriate.

For example, a case where the vehicle 10 is parked at the parking position 76 provided on the parking lot 72 having the upward inclined surface has been described in the embodiment described above, but the present invention is not limited thereto. For example, even if the vehicle 10 is parked at a parking position provided on a parking lot having downward inclination, the automatic parking control can be performed in a similar manner.

In the embodiment described above, a case where the vehicle 10 is automatically parked by the automatic steering performed by the control unit 58 of the calculation unit 52 has been described, but the present invention is not limited thereto. For example, the present invention may be applied to parking assistance for providing assistance when the vehicle 10 is parked by an operation of the user.

In the embodiment described above, the parking position of the vehicle 10, and the features of the parking position and surroundings have been described using the top view images (combined images) of the front camera 12Fr, the rear camera 12Rr, the left side camera 12L, and the right side camera 12R, but the present invention is not limited thereto. For example, description may be made using an image captured by any one of the front camera 12Fr, the rear camera 12Rr, the left side camera 12L, and the right side camera 12R.

In the embodiment described above, a case where the control unit 58 displays the top view image 71 and the like on the touch panel 42 of the vehicle 10 has been described, but the present invention is not limited thereto. For example, the control unit 58 may display the top view image 71 and the like on a display screen of an information terminal (for example, a smartphone or the like) carried by the passenger of the vehicle 10 via the communication unit 24.

In the embodiment described above, a case where the feature map representing the registered features of the designated parking position is registered in the storage unit 54 of the vehicle 10 has been described, but the present invention is not limited thereto. For example, the information may be registered in a storage unit of another device such as a smartphone or a server communicably connected to the vehicle 10.

In the embodiment described above, a case where the user touches the registered parking position image button 62 (a case where the No. 1 image button 62a in FIG. 4 is selected and touched) when parking the vehicle 10 at the registered parking position has been described, but the present invention is not limited thereto. For example, in a case where the user touches the automatic parking button 60 displayed on the touch panel 42 when automatically parking the vehicle 10, the control unit 58 may automatically determine in which parking position the vehicle is to be parked this time by comparing the top view image captured during execution of the automatic parking with the registered top view image, and for example, start the processing in FIG. 9. Accordingly, the user of the vehicle 10 can eliminate an operation of finding and selecting a button for a parking position to be parked this time based on the registered parking position image button 62.

In the embodiment described above, an example in which the moving body is used as a vehicle (four-wheeled automobile) has been described, but the present invention is not limited thereto. For example, a vehicle such as a two-wheeled vehicle or a Segway may be used. Further, the idea of the present invention is not limited to the vehicle, and can also be applied to a robot, a ship, an aircraft, or the like that includes a drive source and that can be moved by power of the drive source.

The control method described in the embodiment described above can be implemented by executing a control program prepared in advance by a computer. The present control program is recorded in a computer-readable storage medium and executed by being read from the storage medium. Further, the present control program may be provided in a form stored in a non-transitory storage medium such as a flash memory, or may be provided via a network such as the Internet. The computer that executes the present control program may be provided in the control device, may be provided in an electronic device such as a smartphone, a tablet terminal, or a personal computer that can communicate with the control device, or may be provided in a server device that can communicate with the control device and the electronic device.

In the present specification, at least the following matters are described. Corresponding constituent elements and the like in the embodiment described above are shown in parentheses, but the present invention is not limited thereto.

(1) A control device including:
an imaging unit configured to acquire imaging data of surroundings of a moving body;
a reception unit configured to receive selection of a predetermined parking position from a user of the moving body; and
a control unit configured to execute automatic parking control for parking the moving body at the predetermined parking position based on the imaging data and the predetermined parking position, and to register the predetermined parking position as a designated parking position, in which
when the moving body is stopped after the automatic parking control is started and before the predetermined parking position is reached, the control unit registers a stop position where the moving body is stopped as the designated parking position.

According to (1), for example, even if there is a difference between the actual predetermined parking position intended by the user and the predetermined parking position recognized by reception of selection from the user due to inclination being different between the position of the moving body when the predetermined parking position is received and the predetermined parking position, it is possible to register the stop position where the moving body is actually stopped as the correct designated parking position. Accordingly, it is possible to prevent a situation where the recognized predetermined parking position and the recognized surrounding objects may overlap with each other and the designated parking position cannot be registered during the automatic parking control, so that usability is improved.

(2) The control device according to (1), further including an obstacle detection unit configured to detect an obstacle around the moving body, in which
when the moving body is stopped in response to the obstacle being detected by the obstacle detection unit after the automatic parking control is started and before the predetermined parking position is reached, the control unit registers a stop position where the moving body is stopped as the designated parking position.

According to (2), for example, even if there is a difference between the actual predetermined parking position intended by the user and the predetermined parking position recognized by reception of selection from the user due to inclination being different between the position of the moving body when the predetermined parking position is received and the predetermined parking position, it is possible to register the stop position of the moving body stopped due to the obstacle around the moving body being detected as the correct designated parking position. Accordingly, it is possible to prevent a situation where the recognized predetermined parking position and the recognized obstacle around the moving body may overlap with each other and the designated parking position cannot be registered during the automatic parking control, so that the usability is improved.

(3) The control device according to (2), in which
when the obstacle is detected by the obstacle detection unit, the control unit performs stop control of stopping the moving body or issues a notification prompting the user to perform a stop operation of the moving body.

According to (3), since the moving body is automatically stopped or stopped by the stop operation of the user when the obstacle around the moving body is detected, it is possible to register the stop position of the moving body as the correct designated parking position.

(4) The control device according to any one of (1) to (3), further including an operation detection unit configured to detect the stop operation of the moving body performed by the user of the moving body, in which
when the moving body is stopped due to the stop operation being detected by the operation detection unit after the automatic parking control is started and before the predetermined parking position is reached, the control unit registers a stop position where the moving body is stopped as the designated parking position.

According to (4), for example, even if there is a difference between the actual predetermined parking position intended by the user and the predetermined parking position recognized by reception of selection from the user due to inclination being different between the position of the moving body when the predetermined parking position is received and the predetermined parking position, it is possible to register the stop position of the moving body stopped by the stop operation from the user as the correct designated parking position. Accordingly, it is possible to prevent a situation where the recognized predetermined parking position and the recognized obstacle around the moving body may overlap with each other and the designated parking position cannot be registered during the automatic parking control, so that the usability is improved.

(5) The control device according to any one of (1) to (4), in which
the control unit acquires a distance threshold related to a distance from the predetermined parking position, and
the control unit registers a stop position as the designated parking position based on a comparison result between a distance from the stop position to the predetermined parking position and the distance threshold, the stop position being a position where the moving body is stopped after the automatic parking control is started and before the predetermined parking position is reached.

According to (5), by providing the distance threshold, it is possible to prevent a situation where a stop position greatly different from the predetermined parking position when selection is received from the user may be registered as the designated parking position.

(6) The control device according to any one of (1) to (5), in which
when the moving body is stopped after the automatic parking control is started and before the predetermined parking position is reached, the control unit inquires to the user as to whether to register a stop position where the moving body is stopped as the designated parking position.

According to (6), since the stop position of the moving body can be confirmed by the user, the stop position can be registered as a more correct designated parking position.

(7) A control method performed by a control device, the control device including:
an imaging unit configured to acquire imaging data of surroundings of a moving body;
a reception unit configured to receive selection of a predetermined parking position from a user of the moving body, and
a control unit configured to execute automatic parking control for parking the moving body at the predetermined parking position based on the imaging data and the predetermined parking position, and to register the predetermined parking position as a designated parking position, the control method including:

registering, by the control unit, a stop position where the moving body is stopped as the designated parking position when the moving body is stopped after the automatic parking control is started and before the predetermined parking position is reached.

According to (7), for example, even if there is a difference between the actual predetermined parking position intended by the user and the predetermined parking position recognized by reception of selection from the user due to inclination being different between the position of the moving body when the predetermined parking position is received and the predetermined parking position, it is possible to register the stop position where the moving body is actually stopped as the correct designated parking position. Accordingly, it is possible to prevent a situation where the recognized predetermined parking position and the recognized surrounding objects may overlap with each other and the designated parking position cannot be registered during the automatic parking control, so that usability is improved.

(8) A non-transitory computer-readable storage medium storing a control program for causing a control unit of a control device, which includes
an imaging unit configured to acquire imaging data of surroundings of a moving body,
a reception unit configured to receive selection of a predetermined parking position from a user of the moving body, and
the control unit configured to execute automatic parking control for parking the moving body at the predetermined parking position based on the imaging data and the predetermined parking position, and to register the predetermined parking position as a designated parking position, to execute processing of:
registering a stop position where the moving body is stopped as the designated parking position when the moving body is stopped after the automatic parking control is started and before the predetermined parking position is reached.

According to (8), for example, even if there is a difference between the actual predetermined parking position intended by the user and the predetermined parking position recognized by reception of selection from the user due to inclination being different between the position of the moving body when the predetermined parking position is received and the predetermined parking position, it is possible to register the stop position where the moving body is actually stopped as the correct designated parking position. Accordingly, it is possible to prevent a situation where the recognized predetermined parking position and the recognized surrounding objects may overlap with each other and the designated parking position cannot be registered during the automatic parking control, so that usability is improved.

What is claimed is:

1. A control device comprising:
an imaging unit configured to acquire imaging data of surroundings of a moving body; and
a processor configured to
receive selection of a predetermined parking position input by a user of the moving body via an input interface; and
execute automatic parking control for parking the moving body at the predetermined parking position based on the imaging data and the predetermined parking position, and register the predetermined parking position as a designated parking position, wherein
when the moving body is stopped after the automatic parking control is started and before the predetermined parking position is reached, the processor registers a stop position where the moving body is stopped as the designated parking position.

2. The control device according to claim 1, wherein
the processor is further configured to detect an obstacle around the moving body, and
when the moving body is stopped in response to the obstacle being detected by the processor after the automatic parking control is started and before the predetermined parking position is reached, the processor registers a stop position where the moving body is stopped as the designated parking position.

3. The control device according to claim 2, wherein
when the obstacle is detected by the processor, the processor performs stop control of stopping the moving body or issues a notification prompting the user to perform a stop operation of the moving body.

4. The control device according to claim 1, wherein
the processor is further configured to detect the stop operation of the moving body performed by the user of the moving body, and
when the moving body is stopped due to the stop operation being detected by the processor after the automatic parking control is started and before the predetermined parking position is reached, the processor registers a stop position where the moving body is stopped as the designated parking position.

5. The control device according to claim 1, wherein
the processor is further configured to
acquire a distance threshold related to a distance from the predetermined parking position, and
register a stop position as the designated parking position based on a comparison result between a distance from the stop position to the predetermined parking position and the distance threshold, the stop position being a position where the moving body is stopped after the automatic parking control is started and before the predetermined parking position is reached.

6. The control device according to claim 5, wherein
when the distance from the stop position to the predetermined parking position is equal to or smaller than the distance threshold, the processor inquires to the user as to whether to register the stop position as the designated parking position, and registers the stop position as the designated parking position based on an instruction from the user.

7. A control method performed by a control device, the control device including:
an imaging unit configured to acquire imaging data of surroundings of a moving body; and
a processor configured to
receive selection of a predetermined parking position from a user of the moving body; and
execute automatic parking control for parking the moving body at the predetermined parking position based on the imaging data and the predetermined parking position, and register the predetermined parking position as a designated parking position, the control method comprising:
registering, by the processor, a stop position where the moving body is stopped as the designated parking position when the moving body is stopped after the automatic parking control is started and before the predetermined parking position is reached.

8. A non-transitory computer-readable storage medium storing a control program for a control unit of a control device, which includes
- an imaging unit configured to acquire imaging data of surroundings of a moving body, and
- a processor configured to
  - receive selection of a predetermined parking position from a user of the moving body, and
  - execute automatic parking control for parking the moving body at the predetermined parking position based on the imaging data and the predetermined parking position, and register the predetermined parking position as a designated parking position, the control program comprising instructions executed by the processor to perform processing of:
- registering a stop position where the moving body is stopped as the designated parking position when the moving body is stopped after the automatic parking control is started and before the predetermined parking position is reached.

\* \* \* \* \*